United States Patent
Li et al.

(10) Patent No.: US 11,226,410 B2
(45) Date of Patent: Jan. 18, 2022

(54) METHOD AND SYSTEM FOR TRACKING OBJECTS USING PASSIVE SECONDARY SURVEILLANCE RADAR

(71) Applicant: Seamatica Aerospace Ltd., St. John's (CA)

(72) Inventors: Yake Li, St. John's (CA); Siu Donald O'Young, St. John's (CA)

(73) Assignee: SEAMATICA AEROSPACE LTD., St. John's (CA)

( * ) Notice: Subject to any disclaimer, the term of this patent is extended or adjusted under 35 U.S.C. 154(b) by 327 days.

(21) Appl. No.: 16/276,053

(22) Filed: Feb. 14, 2019

(65) Prior Publication Data
US 2019/0250266 A1     Aug. 15, 2019

Related U.S. Application Data

(60) Provisional application No. 62/630,362, filed on Feb. 14, 2018.

(51) Int. Cl.
*G01S 13/76*     (2006.01)
*G01S 13/78*     (2006.01)

(52) U.S. Cl.
CPC .......... *G01S 13/762* (2013.01); *G01S 13/781* (2013.01)

(58) Field of Classification Search
CPC .... G01S 13/762; G01S 13/781; G01S 13/933; G01S 13/782; G01S 13/765; G01S 13/726; G01S 13/878; G01S 13/767
USPC ........... 342/32, 37, 29, 30, 39, 36, 455, 456
See application file for complete search history.

(56) References Cited

U.S. PATENT DOCUMENTS

| | | | |
|---|---|---|---|
| 4,115,771 A | 9/1978 | Litchford | |
| 4,418,349 A | 11/1983 | Hofgen et al. | |
| 4,481,349 A | 11/1984 | Marten et al. | |
| 4,782,450 A * | 11/1988 | Flax ...................... | G01S 13/933 |
| | | | 701/301 |
| 4,910,526 A | 3/1990 | Donnangelo et al. | |
| 5,173,706 A * | 12/1992 | Urkowitz ................ | G01S 7/032 |
| | | | 342/101 |

(Continued)

OTHER PUBLICATIONS

Shiomi et al., "Development of Mobile Passive Secondary Surveillance Radar", ICAS 2012, 28th International Congress of the Aeronautical Sciences, pp. 1-6.

(Continued)

*Primary Examiner* — Erin F Heard
*Assistant Examiner* — Michael W Justice
(74) *Attorney, Agent, or Firm* — IP-MEX Inc.; Victoria Donnelly

(57) ABSTRACT

Method for determining a staggered pattern and interrogation mode pattern of an Secondary Surveillance Radar (SSR) is disclosed. The method enables a Passive SSR (PSSR) to work not only inside but also outside the SSR beam. When PSSR is in the wider beam of the SSR, multiple P2-pulses are detected as time-ordered sequence of P2-pulse intervals, from which a repeating sequence and further a stagger pattern is determined. The interrogation mode pattern is determined by comparing the staggered pattern with the interrogation signals. A transmit time of the P3-pulse is predicted based on the staggered pattern and the interrogation mode pattern. Corresponding system is also provided.

28 Claims, 12 Drawing Sheets
(4 of 12 Drawing Sheet(s) Filed in Color)

(56) References Cited

U.S. PATENT DOCUMENTS

| | | | | |
|---|---|---|---|---|
| 5,196,856 A | * | 3/1993 | Litchford | G01S 3/02 |
| | | | | 342/455 |
| 5,198,823 A | * | 3/1993 | Litchford | G01S 3/20 |
| | | | | 342/32 |
| 6,285,318 B1 | * | 9/2001 | Schoen | G01S 5/0221 |
| | | | | 342/357.37 |
| 6,344,820 B1 | | 2/2002 | Shiomi et al. | |
| 6,985,103 B2 | | 1/2006 | Ridderheim et al. | |
| 7,570,194 B2 | | 8/2009 | Galati | |
| 9,218,741 B2 | * | 12/2015 | Wu | G01S 13/878 |
| 9,734,723 B1 | | 8/2017 | Bruno et al. | |
| 2015/0331099 A1 | * | 11/2015 | Wu | G08G 5/0008 |
| | | | | 342/32 |
| 2018/0172797 A1 | | 6/2018 | Hauswald et al. | |

OTHER PUBLICATIONS

Shiomi et al., "Development of Passive Surveillance Radar", ICAS 2014, 29th Congress of the International Council of the Aeronautical Sciences, pp. 1-9.

"Minimum Operational Performance Standards for Air Traffic Control Radar Beacon System / Mode Select (ATCRBS / Mode S) Airborne Equipment", RTCA, Inc., RTCA DO-181E, Washington, DC, Mar. 17, 2011.

* cited by examiner

L = 2 * sqrt(a*a - b*b)

d1 + d2 = 2*a

METHOD AND SYSTEM FOR TRACKING OBJECTS USING PASSIVE SECONDARY SURVEILLANCE RADAR

RELATED APPLICATIONS

This application claims benefit of the previously filed U.S. provisional application Ser. No. 62/630,362 filed on Feb. 14, 2018, the entire contents of which are incorporated herein by reference.

FIELD OF THE INVENTION

The present invention relates to tracking aerial, nautical or ground objects, and in particular to tracking objects in aviation systems using a passive secondary surveillance radar (PSSR).

BACKGROUND OF THE INVENTION

Secondary Surveillance Radar (SSR) systems have been used around the world in air traffic control applications to track positions of an aircraft in the sky and inform pilots in other aircraft accordingly. Precision and efficiency of such tracking systems is particularly crucial at and near the airports where a higher density of flying objects (small or large planes, helicopters, etc.) are present. As such, the SSR systems are often supplemented with other auxiliary systems. Such auxiliary system is a Passive Secondary Surveillance Radar (PSSR) system that operates as a slave system to the conventional master SSR system.

According to the aviation standards, such as the "Minimum Operational Performance Standards (MOPS) for Air Traffic Control Radar Beacon System (ATCRBS) Airborne Equipment" from Radio Technical Commission for Aeronautics (RTCA, Inc.), air traffic control system comprises the SSR having a main rotating antenna transmitting narrow interrogation beams which is assisted with an omni-directional antenna transmitting a related signal. The air traffic control relies on transponders located in an aircraft to reply to the interrogation beams to signal their identity as well as their altitude. The transponder reply signal is broadcast at another standard frequency (for example 1090 MHz). Every interrogation message is composed by three pulses, P1, P2 and P3 at a given standard frequency (for example 1030 MHz). P1 and P3 pulses can only be received when the aircraft is in the main antenna beam (main lobe width of 2-3 degrees). Outside of the main lobe, P1 and P3 are weaker than the P2 pulse. This means that a target object, for example a target object aircraft, can only receive valid interrogation, and then responds when it is in the main lobe of the main antenna beam. P2 pulse also referred to as Side Lobe Suppression (SLS) signal is always synchronized with P1 pulse and transmitted by the omni-directional antenna (hence referred to as omni signal) exactly 2 μs after P1 pulse. P3 pulse is used to determine if the current message is a mode A or mode C interrogation by delaying with different time intervals (8 μs or 21 μs) from P1 pulse. In the transponder, that aircraft are obliged to have, if the received P2 is weaker than P1 by 9 dB, the interrogation is responded; or else the interrogation is ignored. The delay between a reception of the interrogation pulse and the transmission of the reply or response is exactly 3 μs for any transponder. Also, the interrogation time interval is large enough that a response to an interrogation will surely be received before the next interrogation is sent.

The prior art discloses a Passive Secondary Surveillance Radar (PSSR) system that operates as a slave system to a conventional master SSR system. The PSSR system, which comprises an omni-directional antenna and another antenna, is placed on the ground or on an airplane with known locations relative to the master SSR. The SSR interrogation signals are received at the PSSR station as well as at a target aircraft. The transponder reply signal is also received by the PSSR station. The PSSR uses the received P1-P3 pulses or P2 pulses to derive the interrogation time of the SSR, and to further calculate the sum of distances from the aircraft to the SSR and from the aircraft to the PSSR by measuring the time it takes to receive a signal send to the aircraft plus the reply signal.

The SSR antenna and system have evolved for decades including hardware modifications to omni-directional antennas and various interrogation patterns, including staggered interrogation pattern.

To avoid ambiguity or interference in crowded air space, the SSR normally staggers the time intervals between successive interrogations in a fixed pattern. We call this staggered pattern or pulse repetition frequency (PRF) pattern in this invention. For different SSR manufactures and configurations, the staggered pattern is different.

Therefore, it is important to develop improved methods and SSR system that would work reliably for new hardware designs of omni-directions antennas and staggered interrogation patterns.

Also, accuracy of the time measurement is important for PSSR applications. Because a signal travels with a speed of light, so a small amount of error in time could result in a large distance error. This is extremely dangerous in a crowed air space. In this case, even a GPS based time measurement is not precise or reliable enough for collision avoidance.

When the target object is not equipped with a transponder which replies to an SSR interrogation, there should be a method for detecting its existence and giving an estimate of its position.

For a ground based PSSR system, it will receive a reduced signal strength because the SSR antenna is not designed to cover the ground area, and because the ground structures can block the interrogation signals. Moreover, a pilot inside an aircraft will not be informed immediately after the target object is detected, increasing the chance of midair collision.

Therefore, there is a need in the industry for the development of an improved method and PSSR system that would make a reliable detection of target objects.

SUMMARY OF THE INVENTION

It is an objective of the present invention to provide a method to detect a transponder-equipped aircraft or an aircraft without a transponder accurately and constantly. In particular, there is an object of the present invention to provide a method and system for detecting target objects for omni-directional antennas that transmit P2 SLS pulses not within 360 degrees in azimuth, but covering only limited angle coverage, for example about 80 degrees (or any other limited angle) at the front side and the back side of the main SSR antenna, and therefore when P2 pulses are not always available for an observer during the rotation of the SSR antenna. Thus, it is another object of the present invention to provide a method and system for detecting target objects when the prior art does not work, for example when the ownship is out of the coverage of the SSR main beam and the SLS beam at the time it receives a transponder reply from the target object.

According to one aspect of the invention, there is provided a method for determining a pulse repetition frequency (PRF) pattern for a staggered interrogation signal of a Secondary Surveillance Radar (SSR), the method comprising: at a Passive Secondary Surveillance Radar (PSSR) spaced apart from the SSR: (a) receiving side lobe suppression pulses P2 of the staggered interrogation signal comprising pulses (P1, P2, P3), the pulses P1, P3 generated by a main narrow-beam antenna of the SSR, and the pulse P2 generated by a wide-beam antenna of the SSR, the wide-beam antenna having an angular aperture, the pulse P2 synchronized with the pulse P1 and P3 with a predefined time delay; and provided the PSSR is within the angular aperture of the wide-beam antenna: i) receiving a first and second successive P2 pulses, each having a respective pulse reception time, determining a first time interval between the first and second successive P2 pulses, and storing the first time interval as a time-ordered sequence of time intervals; ii) receiving a new P2 pulse and determining a new time interval between said new P2 pulse and a last received P2 pulse; iii) provided said new time interval does not match the first time interval, adding said new time interval to the time-ordered sequence and repeating the steps (ii) to (iii); and iv) provided said new time interval matches the first time interval, and the time ordered sequence starts repeating itself from the first time interval and the new time interval, determining the PRF pattern for the staggered interrogation sequence of pulses based on those time intervals that are between the first time interval and the new time interval.

According to another aspect of the invention there is provided an apparatus for determining a pulse repetition frequency (PRF) pattern for a staggered interrogation signal of a Secondary Surveillance Radar (SSR) comprising:
a memory device in a Passive Secondary Surveillance Radar (PSSR) spaced apart from the SSR having computer executable instructions stored thereon, causing a processor to:
(a) receive side lobe suppression pulses P2 of the staggered interrogation signal comprising pulses (P1, P2, P3), the pulses P1, P3 generated by a main narrow-beam antenna of the SSR, and the pulse P2 generated by a wide-beam antenna of the SSR, the wide-beam antenna having an angular coverage, the pulse P2 synchronized with the pulse P3 with a pre-defined time delay; i) provided the PSSR is within the angular coverage of the wide-beam antenna, receive a first and second successive P2 pulses, each having a respective pulse reception time, determining a first time interval between the first and second successive P2 pulses, and storing the first time interval as a time-ordered sequence of time intervals; ii) receive a new P2 pulse and determining a new time interval between said new P2 pulse and a last received P2 pulse; iii) provided said new time interval does not match the first time interval, add said new time interval to the time-ordered sequence and repeating the steps (ii) to (iii); and iv) provided said new time interval matches the first time interval, and the time ordered sequence starts repeating itself from the first time interval and the new time interval, determine the PRF pattern for the staggered interrogation sequence of pulses based on those time intervals that are between the first time interval and the new time interval.

According to yet another aspect of the invention there is provided a method for determining the interrogation mode of each interrogation inside the stagger interrogation pattern for a SSR, the method comprising: i) receiving successive P1 and P3 pulse pairs, either from the main lobe or the side lobe of the SSR antenna, and determining the interrogation mode of each P1-P3 pair; ii) finding the P1-P3 pulse pair sequence inside the stored interrogation staggered pattern and marking the matched section of the stagger pattern with the corresponding interrogation mode; iii) expanding the interrogation mode of that section to the whole stagger pattern so that the interrogation mode of each of the interrogations inside the staggered pattern can be determined; iv) storing the staggered pattern and its corresponding interrogation mode pattern in storage device for future calibration; v) expanding the staggered pattern and its corresponding interrogation mode pattern to the time periods when neither P2 nor P1-P3 pair can be received.

According to one more aspect of the invention there is provided an apparatus for determining the interrogation mode of each interrogation inside the stagger interrogation pattern for a SSR, the apparatus comprising a memory device storing computer readable instructions causing a processor to: i) receive successive P1 and P3 pulse pairs, from the main lobe or the side lobe of the SSR antenna, and determine the interrogation mode of each P1-P3 pair; ii) find the P1-P3 pulse pair sequence inside the stored interrogation staggered pattern and mark the matched section of the interrogation pattern with the corresponding interrogation mode; iii) expand the interrogation mode of that section to the whole staggered pattern so that the interrogation mode of each of the interrogations inside the staggered pattern can be determined; iv) store the staggered pattern and its corresponding interrogation mode pattern in a storage device for future calibration; v) expand the staggered pattern and its corresponding interrogation mode pattern to the time periods when neither P2 nor P1-P3 pair can be received.

According to yet one more aspect of the invention there is provided a method for determining a position of a target object without a transponder, regardless of the target object being within the SSR main beam or SLS beam, based on the staggered interrogation pattern, the method comprising i) receiving the interrogation signal reflected from the target object close to the ownship; ii) searching the staggered pattern and determining the transmission time of the reflected interrogation; iii) determining an angle of arrival of the reflected interrogation using the dual receiving channel; iv) calculating an estimated position of the target object using the method used in the PSSR system.

According to yet one more aspect of the invention, there is provided a method for determining a pulse repetition frequency (PRF) pattern for a staggered interrogation signal of a Secondary Surveillance Radar (SSR), the method comprising: at a Passive Secondary Surveillance Radar (PSSR) spaced apart from the SSR: detecting side lobe suppression pulses P2 of the staggered interrogation signal comprising pulses (P1, P2, P3), the pulses P1-P3 generated by a main antenna of the SSR, and the pulse P2 generated by a wide-beam antenna of the SSR, the wide-beam antenna having a beam-width, the pulses P2 synchronized with the pulses P1-P3 with a predefined time delay, comprising:

provided the PSSR is within the beam-width of the wide-beam antenna:

i) detecting multiple P2 pulses; ii) forming a time-ordered sequence of P2 pulse intervals; iii) determining a repeating sequence of intervals in the time-ordered sequence of P2 pulse intervals; and iv) deriving the PRF pattern for the staggered interrogation signal of the SSR based on the repeating sequence of intervals.

The method further comprises predicting a transmit time for P1 pulse based on said PRF pattern provided the PSSR is outside the beam-width of the wide-beam antenna, thereby determining the transmit time for the P1 pulse when P2 pulses from the wide-beam antenna are not detectable.

The step of detecting of multiples P2 pulses comprises detecting successive P2 pulses. The step of forming a time-ordered sequence of P2 pulse intervals further comprises detecting a first and second successive P2 pulses, each having a respective pulse detection time, determining a first time-interval between the first and second successive P2 pulses, and storing the first time-interval as the time-ordered sequence of P2 pulses.

The step of determining a repeating sequence of intervals in the time-ordered sequence of P2 pulse intervals further comprises:
iii-1) receiving a new P2 pulse and determining a new time interval between said new P2 pulse and a last received P2 pulse; and iii-2) provided said new time-interval does not match the first time-interval, adding said new time-interval to the time-ordered sequence of P2 pulse intervals and repeating the steps (iii-1) to (iii-2).

Additionally, the step of deriving the PRF pattern for the staggered interrogation signal of the SSR based on the repeating sequence of intervals further comprises:
provided said new time-interval matches the first time-interval, and the sequence of intervals starts repeating itself, determining the PRF pattern based on the repeating sequence of intervals.

Furthermore, the PRF pattern can be updated by applying statistical processing or averaging of the determined PRF pattern and the PSSR is one of a stationary PSSR and a mobile PSSR and The present invention allows determining a position of a target object using the transmit time of the P1 pulse and/or P3 pulse and a reply message from said target object received at said PSSR, wherein said reply message is in response to receiving the P1 pulse and/or P3 pulse at said target object. Additionally, determining the position comprises determining a position of an aerial, nautical or ground object.

The method further comprises determining an interrogation pattern of the PRF pattern wherein said determining comprises (i) determining an interrogation sequence of said main antenna based on P1-P3 pulse combinations; (ii) matching said interrogation sequence in said PRF pattern; and (iii) determining the interrogation pattern of said PRF pattern.

The method of the present invention further comprises a calibration operation to compensate for time drift due to electronics within said PSSR to improve a time accuracy of said transmit time of P1 pulse.

According to yet another aspect of the invention, there is provided a method for determining the interrogation pattern for a PRF pattern comprising, at a PSSR spaced apart from the SSR, the steps of (i) detecting the P1-P3 pulses combination with or without P2 pulses (ii) determining the interrogation mode of each pulse combination (iii) determining the interrogation mode sequence using the P1-P3 combinations (iv) matching the combinations in the stagger pattern and (v) determining the interrogation mode for all interrogations in the stagger pattern.

The method further comprises determining the PRF pattern, using only the main antenna signal, when the ownship is too far from the SSR that an SLS signal cannot be received.

The present invention also provides a method for a three dimensional (3D) positioning a target object without a transponder using a reflection of the interrogation signal and a phased array receiver based on positioning principles of the PSSR. A coherent processing can also be performed on multiple received reflections to enhance the signal strength.

According to yet one more aspect of the invention, there is provided an apparatus for determining a pulse repetition frequency (PRF) pattern for a staggered interrogation signal of a Secondary Surveillance Radar (SSR) comprising:
a memory device having computer executable instructions stored thereon, causing a processor to:
detect side lobe suppression pulses P2 of the staggered interrogation signal comprising pulses P1, P2, P3, the pulses P1 and P3 generated by a main antenna of the SSR, and the pulse P2 generated by a wide-beam antenna of the SSR, the wide-beam antenna having a beam-width, the pulse P2 synchronized with the pulses P1 and P3 with a predefined time delay, comprising:
provided the PSSR is within the beam-width of the wide-beam antenna:
i) detecting multiple P2 pulses and forming a time-ordered sequence of P2 pulse intervals;
(ii) determining a repeating sequence of intervals in said time-ordered sequence of P2 pulse intervals; and
(iii) deriving the PRF pattern for the staggered interrogation signal of the SSR based on the repeating sequence of intervals.

The computer executable instructions further cause the processor to determine an interrogation pattern of said PRF pattern based on P1-P3 pulses combinations.

The computer executable instructions also cause the processor to predict a transmit time for P1 and/or P3 pulse based on said PRF pattern when the PSSR is outside the beam-width of the wide-beam antenna.

The computer executable instructions further cause the processor to determine a position of a target object using the transmit time of the P1 and/or P3 pulse, the target object being one of an aerial, nautical or ground object.

According to yet one more aspect of the invention, there is provided a method for determining a position of a target object, comprising: processing at an onboard Passive Secondary Surveillance Radar (PSSR) system, signals received from a Secondary Surveillance Radar (SSR) to identify a plurality of P2 Pulses, wherein said P2 pulses are transmitted in a staggered pattern through a wide-beam antenna having a beam-width and wherein said PSSR can detect the P2 pulses when it is within said beam-width of said wide-beam antenna; forming a time-ordered sequence of P2 pulse intervals from said P2 pulses; determining a pulse repetition frequency (PRF) pattern of said P2 pulses, based on an identification of a repeating sequence of intervals in said time-ordered sequence of P2 pulse intervals; receiving a reply from the target object wherein said reply is responsive to an interrogation signal comprising a P1 pulse sent by the SSR to said target object; estimating a transmit time of said P1 pulse interrogation signal based on a reception time of said reply and the PRF pattern of the P2 pulses; and determining the target object position based on the target object altitude information h contained on said reply and on a localization operation using PSSR system location, SSR location, said transmit time of said P1 pulse interrogation signal and said reception time of said reply.

An interrogation pattern of said PRF pattern is further determined based on P1-P3 pulse combinations.

Because the P2 pulse is synchronized to said P1 pulse interrogation signal with a predefined time delay, the PRF pattern of the P1 pulses can be determined by applying a time shift equal to said predefined time delay to the PRF pattern of the P2 pulses.

According to yet one more aspect of the invention, there is provided a Passive Secondary Surveillance Radar (PSSR) system for determining a position of a target object, comprising: a first receiver for receiving a reply from the target object wherein said reply is responsive to an interrogation signal comprising a P1 and a P3 pulse sent by a Secondary Surveillance Radar (SSR) to said target object; a second receiver for receiving from said SSR a plurality of P2 Pulses, wherein said P2 pulses are transmitted in a staggered pattern through a wide-beam antenna having a beam-width and wherein said second receiver can detect the P2 pulses when it is within the beam-width of said wide-beam antenna; and a memory device having computer executable instructions stored thereon, causing a processor to: process said plurality of P2 Pulses to form a time-ordered sequence of P2 pulse intervals; determine a pulse repetition frequency (PRF) pattern of said P2 pulses, based on an identification of a repeating sequence of intervals in said time-ordered sequence of P2 pulse intervals; estimate a transmit time of said P1 pulse interrogation signal based on a reception time of said reply and the PRF pattern of the P2 pulses; and determine the target object position based on an altitude information of the target object present on said reply and on a localization operation using a location of the PSSR system, a location of the SSR, said transmit time of said P1 pulse interrogation signal and said reception time of said reply.

The PSSR system comprises a mixer and a local oscillator for translating the reply into an intermediate frequency band reply signal and for translating the P2 pulses into an intermediate frequency band P2 pulses; and a single channel high-speed Analog-to-Digital Converter (ADC) for digitizing said intermediate frequency band reply signal and said intermediate frequency band P2 pulses and transmitting digitized intermediate frequency band reply signal and digitized intermediate frequency band P2 pulses to said processor.

Alternatively, the PSSR system may comprise a first mixer and a first local oscillator for translating the reply into a baseband reply signal; a second mixer and a second local oscillator for translating the P2 pulse into a base band P2 pulses; and a dual channel high-speed Analog-to-Digital Converter (ADC) for sampling said baseband reply signal and said baseband P2 pulse and transmitting sampled baseband reply signal and sampled baseband P2 pulses to said processor.

In addition, the location of the PSSR is determined using a GPS unit, the location of the SSR being a fixed location known to the PSSR system.

According to yet another aspect of the invention, there is provided a Passive Secondary Surveillance Radar (PSSR) system in which the second receiver further receives a plurality of interrogation signals from said SSR, wherein said interrogation signals are transmitted in a staggered pattern through the main antenna having a beam-width and wherein said second receiver can detect the interrogation signals when it is within the beam-width of said main antenna (MA); and the computer executable instructions further cause the processor to process said plurality of interrogations to form a time-ordered sequence of interrogation mode; determine an interrogation pattern of said PRF pattern, based on matching of the MA interrogation sequence in said time-ordered stagger pattern sequence; process said plurality of interrogation signals to form a rotation profile of the main antenna of the SSR; wherein said rotation profile and said interrogation pattern are used in estimating said transmit time of said P1 pulse.

A Passive Secondary Surveillance Radar (PSSR) can determine the position of a target object when the target object is in the main (P1, P3-pulse) beam of a Secondary Surveillance Radar (SSR) but requires the PSSR to be simultaneously within the main (P1, P3-pulse) beam or the wider (P2-pulse) beam of the said SSR. A method for determining a staggered pattern and interrogation mode pattern from a staggered interrogation signal of a SSR is disclosed. This method enables a PSSR to work not only inside but also outside the wider P2 pulse beam. At a PSSR spaced apart from the SSR, P2 pulses of the staggered interrogation signal (P1, P2, P3) are detected, where P1 and P3 are generated by a main narrow-beam antenna of the SSR, and P2 is generated by a wide-beam antenna of the SSR having a beam-width. P2 pulses are synchronized in time with P3 pulses. Provided the PSSR is within the beam-width of the wide-beam antenna, multiple P2 pulses are detected as time-ordered sequence of P2 pulse intervals. A repeating sequence of time intervals in the time-ordered sequence can be determined, and the stagger pattern is determined based on the determined repeating sequence. In another case, when the PSSR is too far from the SSR, and P2 pulses are too weak to be detected, the staggered pattern can be determined using only the stronger P1 and P3 pulses from the narrow-beam signal of the main antenna (MA main lobe) using longer observation time. The interrogation mode pattern can be determined by comparing the said staggered pattern with the narrow-beam P1 and P3 signals. A transmit time of the P1 and/or P3 pulse is predicted based on said staggered pattern and said interrogation mode pattern. When the target object does not have a transponder, the positioning principle of the PSSR can also be used to determine a 3D position of the target object using the reflected interrogation signal from the target object, an angle of arrival measured from a phase array receiver, and a precise time of the interrogation predicted from the PRF or staggered pattern. Corresponding system is also provided.

Thus, an improved method and system for passive secondary surveillance radar (PSSR) tracking have been provided.

BRIEF DESCRIPTION OF THE DRAWINGS

The application contains at least one drawing executed in color. Copies of this patent or patent application publication with color drawing(s) will be provided by the Office upon request and payment of the necessary fee, For a better understanding of the embodiments and/or related implementations described herein and to show more clearly how they may be carried into effect, reference will now be made, by way of example only, to the accompanying drawings which show at least one exemplary embodiment and/or related implementation in which.

DETAILED DESCRIPTION OF EMBODIMENTS

Figure 1:
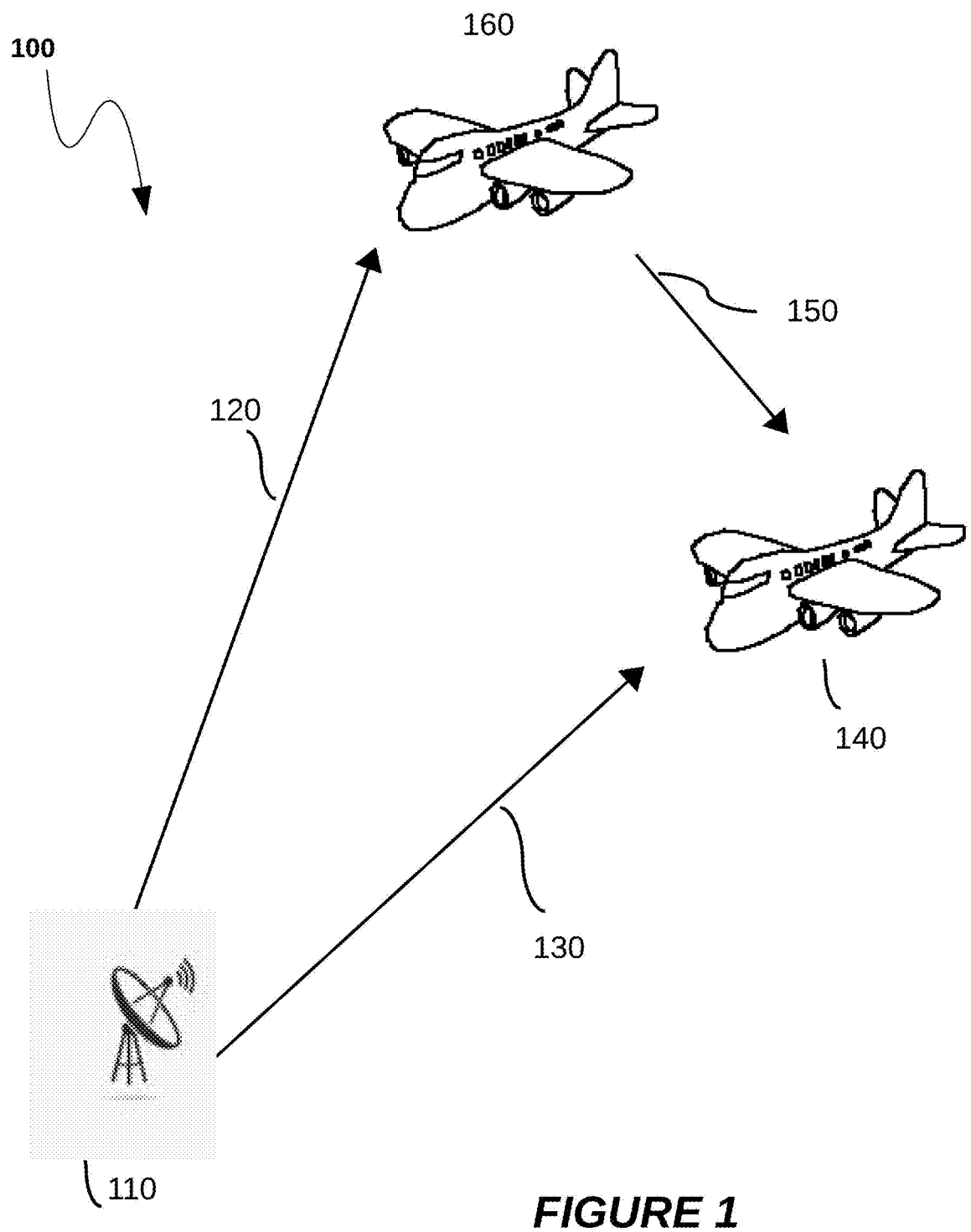
FIG. 1 illustrates an SSR system and ownship having a PSSR system on board for detecting a target object.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments and/or implementations described herein. However, it will be understood by those of ordinary skill in the art that the embodiments and/or implementations described herein may be practiced without these specific details. In other instances, well-known methods, procedures and components have not been described in detail so as not to obscure the embodiments and/or implementations described herein. Furthermore, this description is not to be considered as limiting the scope of the embodiments described herein, but rather to describe the structure and operation of the various embodiments and/or implementations described herein.

It would be beneficial for an aircraft to have a PSSR system onboard to be able to detect positions of other aircraft in its vicinity. Preferably, it would be highly beneficial to take advantage of the existing systems and infrastructure to do so and in compliance with the aviation standards. In this description, the aircraft that carries the on board PSSR is referred to as the ownship ("our" aircraft) to distinguish it with the "other" aircraft (also referred to as a target object) whose location needs to be determined. The teachings of this invention are not limited to detecting aircraft. Any flying object (for example a drone) may be detected as long as it is equipped with functioning transponders. Moreover, in some embodiments the ownship may be a vehicle on the ground or water which is a special case of the most general 3-dimensional (3D) teachings.

FIG. 1 illustrates a generic configuration 100 in which the present invention can be deployed showing the ownship 140, having a Passive Secondary Surveillance Radar (PSSR) system on board (shown in FIG. 3), in relation to the master SSR system 110 and a target object represented as target object 160.

A major difference between the present approach of FIG. 1 and the prior art systems is that the PSSR of the ownship 140 is airborne and it works even when the ownship cannot receive any signals from the SSR. In the generic configuration 100, the SSR 110 transmits interrogation signals P1, P2 and P3 that can be received at the target object 160, this transmission path is represented as path 120. P1 and P3 pulses are transmitted through a narrow beam antenna of the SSR 110. The interrogation signals include the side lobes suppression pulses P2 that the SSR 110 transmits through a wide-beam antenna that can be received at the ownship 140. This is represented as path 130. The target object 160 broadcast reply is received at the ownship 140 through transmission path 150 for further processing to derive information necessary to locate and identify the target object 160 as will be described hereinafter.

The successive interrogations transmitted by the SSR 110 are not equally spaced for modern SSR system. They follow a fixed pulse repetition frequency (PRF) pattern, which is called 'staggered PRF'. This PRF pattern needs to be determined before a correct interrogation time can be predicted when the ownship is not covered by the Main Antenna (MA) and SLS beam. The determination of the PRF or stagger pattern based on the main-lobe observation can be slow and unreliable solely because only 7 to 10 interrogations can be observed at the ownship 140 within every rotation of the SSR 110 antenna. If the PRF pattern is long, it will take a longer time to determine the PRF pattern, which slows down the positioning of the target object long enough to cause midair collision hazards. A faster way of determining the PRF pattern is to use P2 pulses. Hundreds of P2 pulses can be observed in each rotation of the SSR 110 antenna, and therefore the PRF pattern is very likely to be determined within a small section of each rotation of the SSR 110 antenna. This greatly increase the speed of the algorithm and hence improve the safety of the ownship 140.

Current implementation of the antenna for P2, although referred to in some literature as omni-directional antenna, is actually a wide-beam antenna covering about 80 degrees of the front and the back of the MA for a total of about 160 degrees. It is understood that teachings of the present invention also apply for any other limited angle apart from about 80 degrees, covering less than 180 degrees of the front and less than 180 degrees of the back of the MA. In such situation, the ownship 140 can only receive the P2 when it is in its coverage area or beam-width and hence the ownship 140 in operation will not receive any reference signal from the SSR for about 200 degrees within a complete rotation of the SSR 110 antenna. The present application provides a method to estimate the P2 pulses transmit times with an incomplete observation of the P2 pulses as will be described below.

Figure 2A:
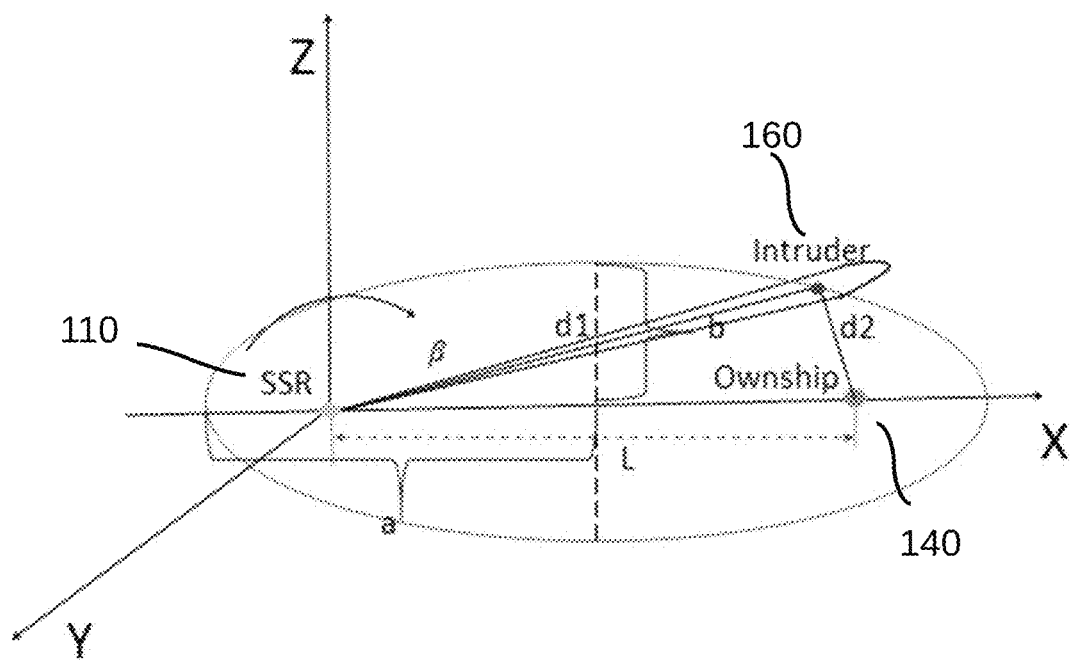
FIG. 2A illustrates geometry of the configuration of FIG. 1 for calculation of the position of the target object.

FIG. 2A illustrates a geometry of the above configuration in FIG. 1 where the SSR 110 and ownship 140 are shown as the two focal points. The SSR 110 is shown to be on the origin of the XYZ Cartesian coordinate system. Generally, in a 3-dimensional (3D) space, the surface composed by the points from which the sum of the distances to the two focal points is a constant is known to be a spheroid. For the purpose of the discussion, an elliptical cross-section of the spheroid on a 2-dimensional (2D) plane shown is sufficient because the altitude of the target object can be determined by its Mode C reply message. The 2D plane contains the major axis of the 3D spheroid. Mathematically, the coordinates of the target object 160 can be obtained from the following equations:

$$x = \frac{2b^2 c \pm \sqrt{\frac{4b^4 c^2 - 4(b^2 + a^2 \tan^2(2\pi - \beta))}{(b^2 c^2 + a^2 h^2 - a^2 b^2))}}}{2(b^2 + a^2 \tan^2(2\pi - \beta))}$$

$$y = x \tan(2\pi - \beta)$$

$$z = -h$$

where a and b are defined in FIG. 2A; c=L/2, h is the altitude of the target object 160, and β is the angle from X-axis clockwise to the center of the Main Antenna (MA), ranging from 0 to 360 degrees. The above equations are obtained from the real spheroid geometry in 3D instead of the depicted ellipse. That is because neither of the ownship 140 and the target object 160 is on the same altitude of SSR 110. Other techniques that can be used to localize the target object 160 include multilateration and triangulation techniques and are well known to those skilled in the art.

The geometry depicted in FIG. 2A, illustrates the case where the target object 160 is within the beam-width or coverage area of the SSR 110 MA main-lobe while the ownship 140 is outside of that radiation field. Additionally, because the wide-beam antenna coverage is ±40 degrees wide around the MA, the ownship 140 is within its coverage area and therefore the ownship 140 can see the P2 pulses transmitted by the wide-beam antenna of the SSR 110; however ownship cannot see neither P1 nor P3 pulses. In this geometry the ownship 140 can detect both the P2 pulses and the reply signals from the target object 160.

Figure 2B:
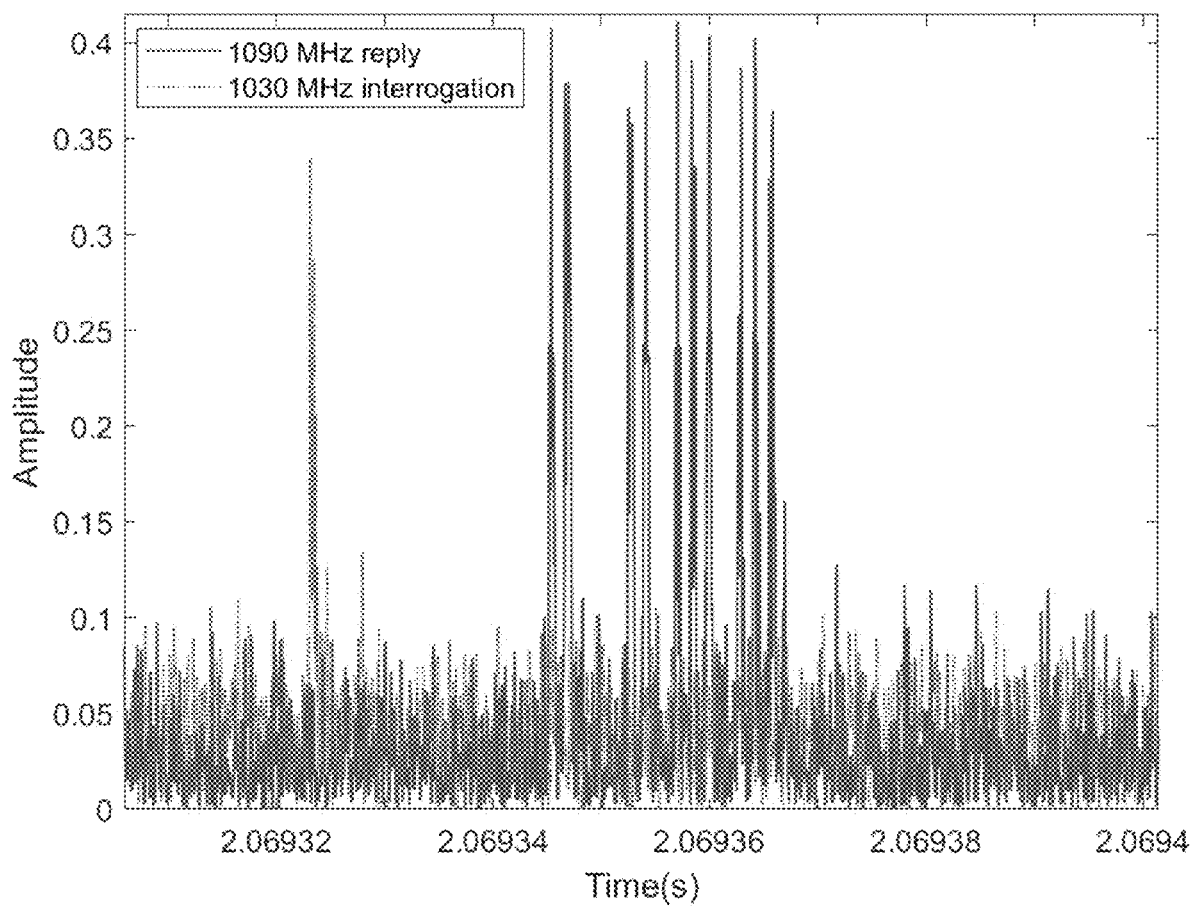
FIG. 2B illustrates the signal received by ownship in the configuration shown by FIG. 2A.

FIG. 2B shows the signals received by the ownship 140 with the reply from the target object 160 in solid line and the P2 pulse in dashed line corresponding to an interrogation signal that trigger the reply. The group of the solid line pulses is one complete reply message triggered by the interrogation corresponding to the P2 pulse.

In this geometry the ownship 140 can readily detects the P2 pulses. The method of the invention reads the time instances of this P2 pulses and applies the algorithms described below to determine the stagger or PRF pattern of the P2 pulses and therefore predict the occurrences of the P2 pulses even when it cannot be observed at the ownship 140. The transmit time of the P1 pulse can then be derived from the occurrences of the P2 pulses, and transmit time of P3 pulse can also be derived once the interrogation pattern is determined.

Figure 2C:
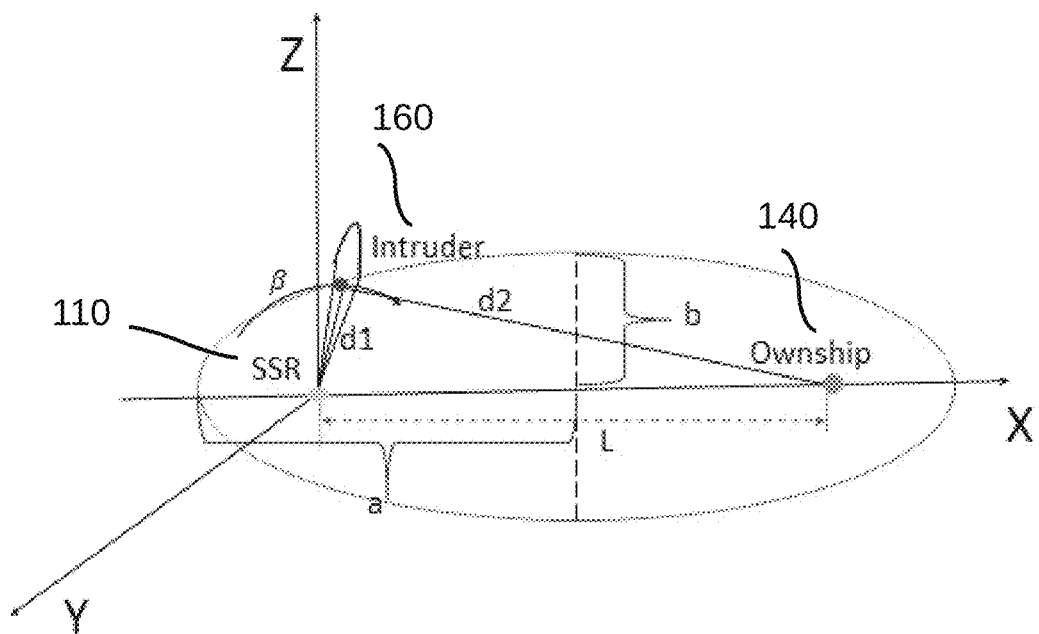
FIG. 2C illustrates a geometry of the configuration of FIG. 1 when ownship is out of the wide-beam antenna coverage.
Figure 2D:
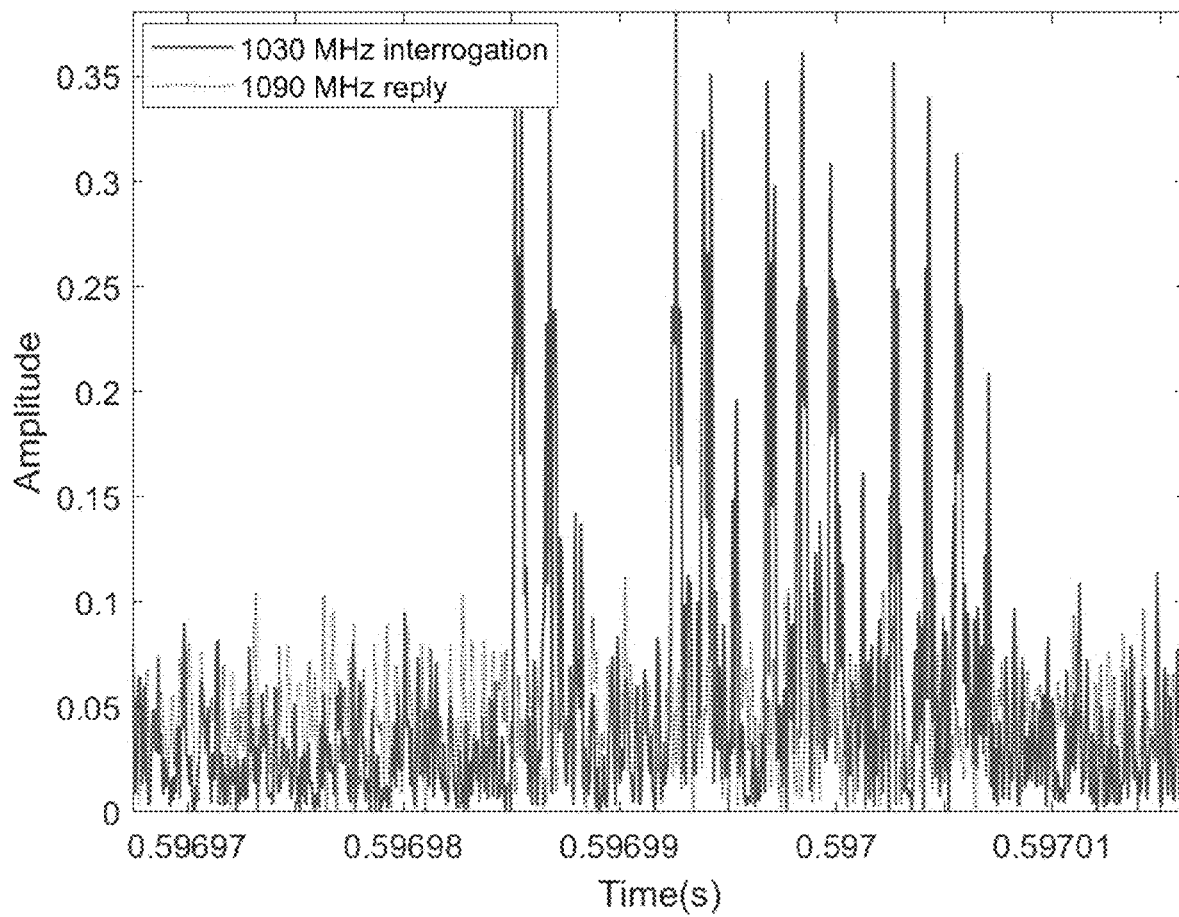
FIG. 2D illustrates the signal received by ownship in the configuration shown by FIG. 2C.

FIG. 2C shows another geometry corresponding to the case where the angle between the main-lobe of the SSR 110 Main Antenna and the X-axis is almost 90 degrees. The wide-beam transmission does not cover the ownship 140 area. In this geometry only the 1090 MHz reply from the target object 160 is observed, while none of the pulses comprising an interrogation signal is observed. The signals observed by the ownship are shown in FIG. 2D. The dashed plot is a signal around the 1030 MHz received by the ownship 140, and a solid plot is the 1090 MHz reply signal. As can be seen, the 1030 MHz receiver channel only shows noise, while none of the P1, P2 or P3 pulses is received. In this case, the device has to predict the interrogation that triggers the reply received by the ownship 140 using the PRF pattern of the P2 pulses to be able to position the target object 160.

For calculating the sum of the distance d1 from the SSR to target object 160 and the distance d2 from target object to ownship in this case, the time interval between the leading edge of the predicted P2 (the transmit time of the P2 pulse can be predicted for the case shown in FIG. 2D using the algorithm described below) and the reply message as shown in FIG. 2D should be calculated. Assume the stagger pattern and its interrogation mode have been determined using the algorithms described below, and the time between the assumed P2 pulse to the reply is α1 seconds, then the sum distance can be $d_t = d_1 + d_2$ calculated as:

$$dt = c(\alpha 1 - 6e-6 - 3e-6) + L \text{ for Mode } A \text{ interrogation;}$$
and $$dt = c(\alpha 1 - 19e-6 - 3e-6) + L \text{ for Mode } C \text{ interrogation;}$$

where c is the speed of light, L is the distance between the SSR and the ownship as shown in FIG. 2C. $d_t$ is actually the parameter 2a in FIG. 2A. The reply message is transmitted after the transponder receives the P3 pulse. Therefore, for different modes, the reply time that is lagging the P2 pulse time is different. In Mode A interrogation, the P3 pulse is sent 6 microseconds after the P2 is transmitted, while in Mode C interrogation, the P3 pulse is sent 19 microseconds after P2. This is why for different interrogation mode, the formula above to calculate the sum distance is different. And for this reason, to profile and predict the interrogation mode of each interrogation in the stagger pattern is very important. The 3 microseconds in both equations are the fixed transponder delay.

Figure 3:
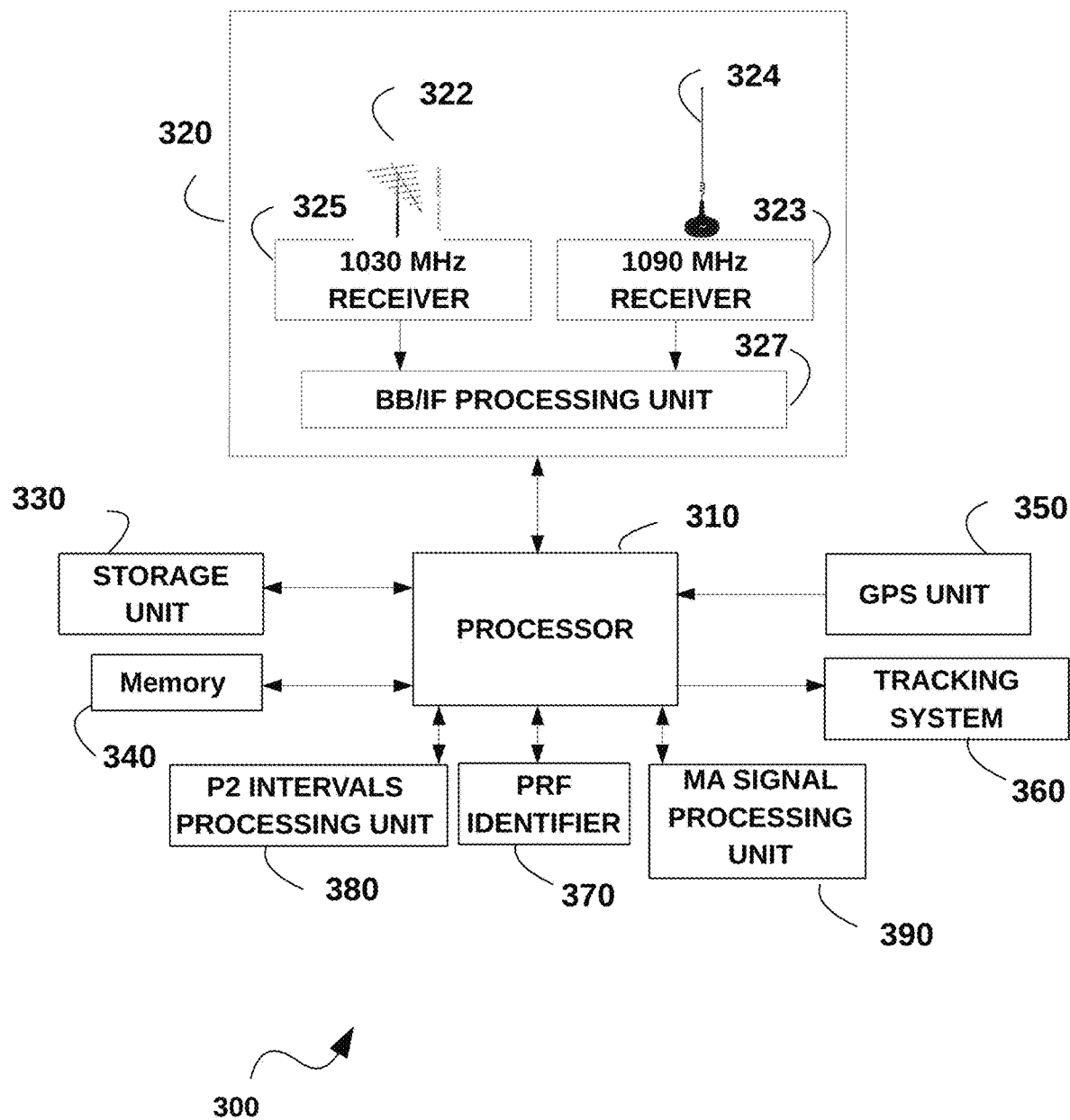
FIG. 3 illustrates various components of a mobile PSSR system.

FIG. 3 illustrates a Passive Secondary Surveillance Radar system PSSR 300 embedded in the ownship 140 for detecting a target object such as target object 160 and determining its positional information.

The PSSR system 300 comprises a receiver unit 320 for receiving, through an antenna system (322, 324) SSR mode C, all-call, and roll-call interrogations signals 130 comprising P1, P2 and P3 pulses and Mode A/C replies 150 from the target object 160. In a preferred embodiment, the receiver unit 320 comprises an omni-directional antenna 324 (such as a dipole). Since transponders generally use an omni-directional antenna, the ownship 140 can always receive reply messages from the target object 160. The receiver unit 320 may further comprise a directional antenna 322, for example for detection of the signals transmitted by the SSR 110 to enhance the SSR range when needed. Optionally, a multiple antenna array may be added to the receiver unit 320 to estimate the angle of arrival (AOA) of the target object 160 reply signal, which is useful for the case when the target object does not have a transponder.

The receiver unit 320 comprises a 1030 MHz receiver 325 connected to the directional antenna 322 or to the omni-directional antenna 324 through splitter (not shown) for detecting the interrogation signals transmitted by the SSR through the narrow-beam antenna (P1, P3) or the SLS signal (P2 pulse) through the wide-beam antenna of the SSR 110. The 1030 MHz receiver 325 is tuned to the 1030 MHz frequency band for receiving and filtering P2 as well as P1 and P3 signals in that frequency band. The receiver unit 320 comprises also a 1090 MHz receiver 323 tuned to 1090 MHz frequency band for receiving and filtering signals around 1090 MHz through the omni-directional antenna 324. The 1090 MHz receiver 323 detects reply signals from target object 160 which are transmitted at the 1090 MHz frequency. Both the 1030 MHz receiver 325 and 1090 MHz receiver 323 are connected to a Baseband/Intermediary Frequency (BB/IF) processing unit 327 for receiving the signals detected by the receiver 325 and receiver 323 and converting them into a baseband or into an intermediary frequency using a local oscillator as will be described in FIGS. 6A and 6B, respectively. The BB/IF processing unit 327 digitizes the received signals and pass the digitized signals along to a processor 310 for further processing.

In one embodiment processor 310 provides the processing power for performing the operations of the present invention. The processor 310 can be a micro-controller or a microprocessor or any processor device capable of executing the operations of the present invention, such processor devices are well known to those skilled in the art. The processor 310 receives digital signals from the receiver unit 320 and executes operations dictated by operating modules embedded or connected to the processor 310. In this embodiment a P2 intervals processing unit 380, along with the processor 310, process the signals corresponding to the P2 pulses for determining the time intervals between P2 Pulses received at the PSSR 300. The P2 intervals processing unit 380 creates a time-ordered sequence of P2 Pulse intervals that are stored in a memory device 340. The time-ordered sequence of P2 Pulse intervals is a sequence of intervals formed from the received P2 pulses and ordered according to the reception time of the P2 pulses. As an example, for 4 pulses received respectively at times $t_0$, $t_1$, $t_2$ and $t_3$, the time-ordered sequence of pulse intervals would be ordered as intervals $I_1$, $I_2$ and $I_3$ with $I_n$ formed from P2 pulses received at time n and at time n−1. The P2 intervals processing unit 380 adds as well any new interval determined from a new P2 pulse and the last received P2 pulse to the time-ordered sequence of pulse intervals, and compares the new interval to the previously stored pulse intervals in the time-ordered sequence of pulse intervals. The PRF Identifier 370 based on the result of that comparison applies a procedure to identify a repeating sequence of intervals and determine the PRF pattern. The procedures applied by the P2 intervals processing unit 380 and the PRF identifier 370 would be described in detail with regard to FIG. 5A.

In another embodiment processor 310 communicates with the SSR main antenna (MA) signal processing unit 390. The MA signal processing unit 390 identifies and decodes the Mode A/C messages that includes P1 and P3 pulses, no matter whether P2 is stronger or weaker than P1. These messages could come from the main lobe or side lobe of the MA. The main functions of the MA signal processing unit 390 include two parts: i) to determine the pattern of the interlaced Mode A/C interrogation, which is the interrogation pattern. This pattern could be ACACAC or AACAAC, etc. With the MA interrogation sequence and the interval between successive interrogations, a match of the MA pattern inside the whole stagger pattern can be found, and further to determine the type for every interrogation in the stagger pattern; ii) to determine the mechanical rotation of the MA. The procedures applied by the MA signal processing unit 390 will be described in detail with regard to FIG. 5B.

As illustrated in FIG. 3, the PSSR 300 relies on a data storage system 330 and a memory 340 both connected to the processor 310 to store data and information necessary to its operation. Permanent or long-term data such as SSR location, PRF pattern once identified can be stored in the data storage 330 while short-term data such as time-ordered sequence of pulse intervals, cached data or other program instructions can be stored in the memory 340.

The PSSR system 300, in a preferred embodiment, comprises a Global Positioning System (GPS) unit 350 for determining the location of the ownship 140. All the information related to the position and trajectory of the ownship 140 as well as the target object 160 is displayed on a display for advising the pilot of the ownship 140. In one embodiment, the display is part of a tracking system 360 that monitors the relative distance between the two objects (target object 160 and ownship 140). The tracking of the position and trajectory of the ownship 140 and target object 160 on the display provides a visual cue to the pilot of the ownship 140 to know the relative spacing between the ownship 140 and target object 160 and to take appropriate measures to mitigate any potential problem. More importantly, this allows the prediction of the target object movement based on the previous detection results and provide a confident estimation of the position of the target object even when the detection of the target object is missed in several detections. Additionally an audio alarm system may be provided as part of the tracking system 360 to alert the pilot as well. Alternatively, the display may be standalone or shared with other components such as a computing device within the ownship 140 and/or the GPS unit 350 and the tracking system 360.

Figure 4:
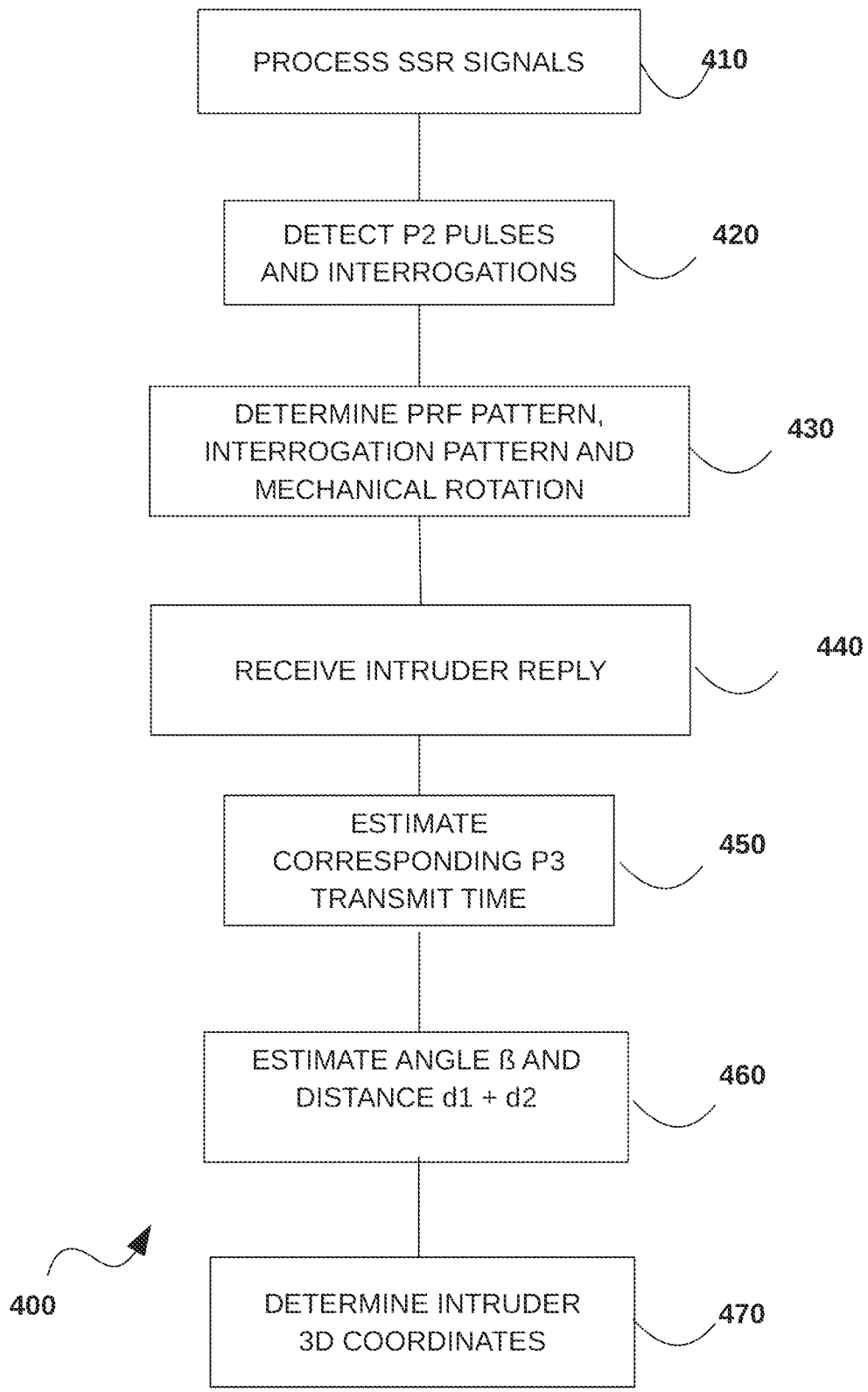
FIG. 4 illustrates a flowchart for determining a position of the target object.

A general operation of the PSSR 300 for finding location information of a target object such as target object 160 will now be described using an exemplary method depicted in the flowchart 400 of FIG. 4. At step 410 the PSSR receives signals transmitted by the SSR 110 at the 1030 MHz frequency band. The signals are received through the 1030 MHz receiver 325 which processes the signals as described in FIG. 3 and passes the information to the BB/IF processing unit 327 at step 420 for detecting the P2 pulses from the signals received. The reception times of the P2 pulses are as well recorded for the computation of the P2 pulses intervals. After detecting the P2 pulses and the interrogation sequence, a PRF determining step 430 applies a PRF identification procedure to identify a repetition pattern and corresponding interrogation type of the P2 pulses based on time intervals of the detected P2 pulses and the interrogations inside the MA. FIG. 5 will detail the procedure used by step 430 to determine the PRF (or stagger) and interrogation pattern of the P2 pulses.

As stated above one objective of the PSSR is to determine a position of a target object such as a target object 160 and display its positional information on a display of the ownship 140. For that purpose, the PSSR 300 onboard the ownship 140 receives reply signals at step 440 from the target object 160 and determines the reception time of the reply signal. The target object 160 transmits the reply signal in response to receiving from the SSR 110 an interrogation signal comprising P1 and P3 pulses transmitted through the main lobe of the narrow-beam antenna of the SSR 110. The reply signal contains the target object 160 identification information as well as its current altitude information. At step 450 the PSSR 300 uses the reception time of the reply signal from the target object 160 and the estimated interrogation signal from SSR 110 to determine the ellipse shown in FIG. 2A and FIG. 2C. As stated above, the P2 pulse is synchronized with the P3 pulse with a predefined time interval equal to 6 microseconds for Mode A interrogation and 19 microseconds for Mode C interrogation. Therefore, the PRF of the P2 pulses mimics the PRF of the P3 pulses albeit with a 6 or 19 microseconds time shift. The PRF of the P2 pulses also mimics the PRF of the P1 pulses with a 2 microseconds time shift. The critical point in measuring the position of the target object 160 is to estimate or predict when (and mode) the interrogation signal is transmitted from the SSR 110. In the case the reply signal is received while the PSSR 300 is within the coverage area of the SSR wide-beam antenna as depicted in FIG. 2A, the P2 pulse is then readily detectable from the wide-beam antenna and the PSSR 300 can directly estimate the transmit time of the interrogation signal P1 through the detection of P2 pulse and the estimation of the corresponding mode of this P2 pulse.

Alternatively, for the time/angles when the P2 pulses are not observed or too weak to be identified, which corresponds to the scenario depicted in FIG. 2C, the transmit time of the interrogation signal is not known directly, and hence need to be predicted in real time based on the stagger pattern and interrogation pattern determined. In this scenario, the PSSR 300 predicts a transmit time of the interrogation signal P3 based on the stagger pattern and corresponding interrogation mode identified at step 430. Because the interrogation signal P3 is always synchronized with the P2 pulse, when the transmit time and corresponding interrogation mode of a P2 pulse is known, the end of the transmit time of the interrogation signal associated with this given P2 is known. The transmit time of the P1 pulse can as well be derived from the PRF pattern based on the known time delay between the 2 pulses.

At step 460, the PSSR 300 estimates the angle β and the sum of the distances d1 and d2 described with regards to FIG. 2A based on the interrogation mode, transmit time and reply signal reception time. Using the mechanical pointing direction of the SSR MA and the ellipse determined by the sum of the distance d1 and d2, in the flowchart at step 470, the PSSR 300 can estimate the 3D coordinates of the target object 160. the 3D coordinates can be estimated using in particular the spheroid equations described with regards to FIG. 2A.

Figure 5A:
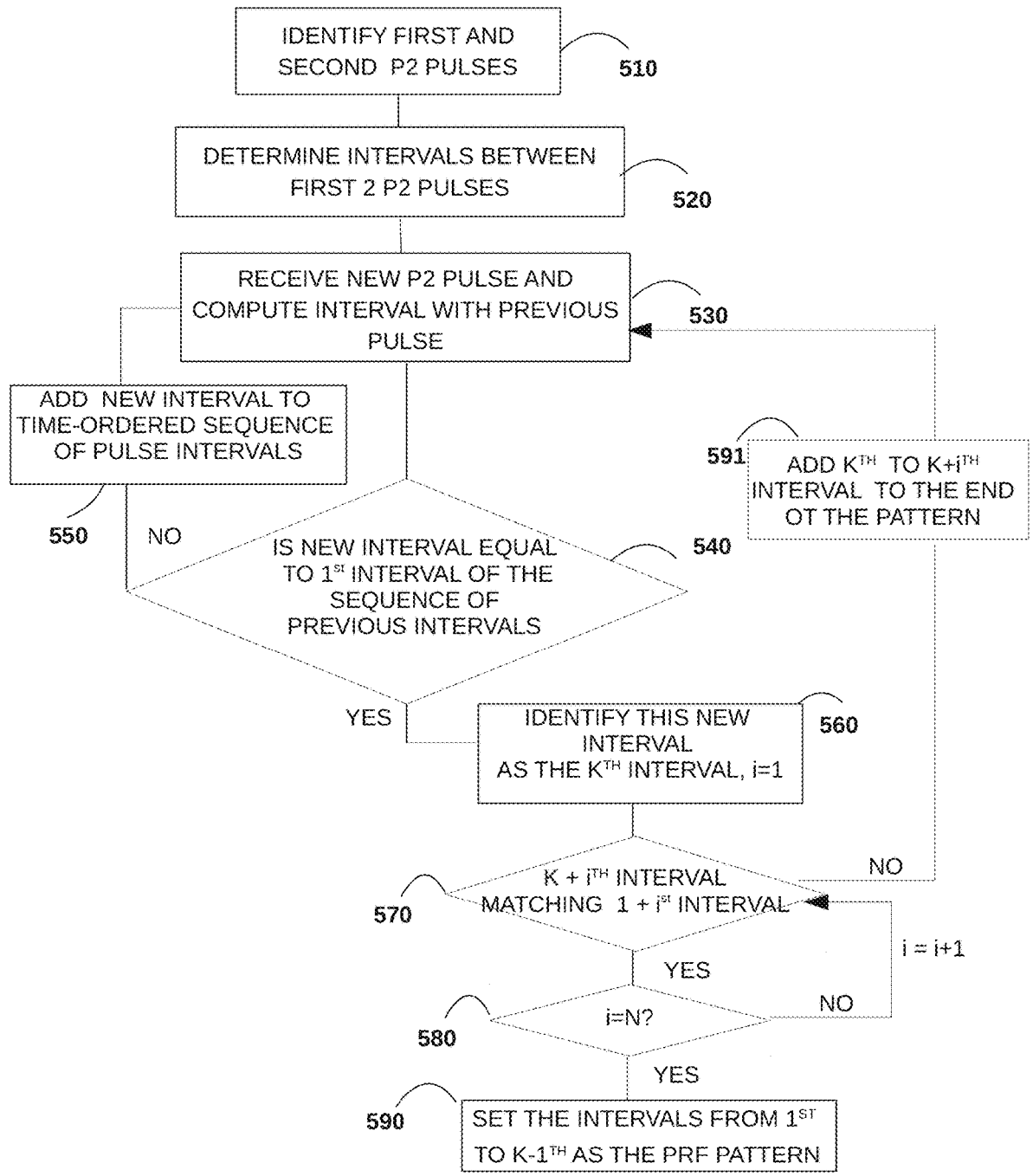
FIG. 5A illustrates a flowchart for obtaining a PRF pattern.

FIG. 5A details the operation of step 430 for determining the PRF or stagger pattern of the flowchart 400. At step 510 the $1^{st}$ and $2^{nd}$ P2 pulses are identified and a $1^{st}$ interval between the two pulses is determined at step 520. The $1^{st}$ interval is used as the initial interval of the time ordered-sequence of pulse intervals. When a new pulse is received, a new interval is computed at step 530, in the present invention, computing a new interval is based on a new pulse and the last valid received pulse, as stated previously in the description of FIG. 3.

The identification of the PRF pattern is based on an identification of a repeating sequence of intervals within the time-ordered sequence of pulse intervals as defined previously. The PSSR 300 at step 540 compares the new interval with the first interval and if there is no match the new interval is added to the time-ordered sequence of pulse intervals at step 550 and the flowchart loops back to step 530 to receive a new P2 pulse and determine a new interval.

If at step 540 a new interval matches the $1^{st}$ interval, the procedure for identifying the repeating sequence starts at step 560 with said new interval identified as the $K^{th}$ interval. The $i^{th}$ (i from 1) interval after the $K^{th}$ interval will be examined one by one to see if it matches the $1+i^{th}$ interval until a) if i reaches N, for example N=6, then the intervals before $K^{th}$ are the stagger or PRF pattern (1 to $k-1^{th}$); or b) if the $i^{th}$ interval after $K^{th}$ does not match $1+i^{th}$ interval, then all the intervals between $K^{th}$ (include $K^{th}$) and $K+i^{th}$ (include $K+i^{th}$) will be added to the end of the stagger pattern and the algorithm goes back to 530 to continue to examine new arrived P2 pulses.

Although the flowchart of FIG. 5A compares at step 540 the new interval to the $1^{st}$ interval, the comparison could be performed between the new interval and a previous $m^{th}$ interval and therefore the PRF pattern would be the intervals between the $m^{th}$ and the $K^{th}$ interval.

Figure 5B:
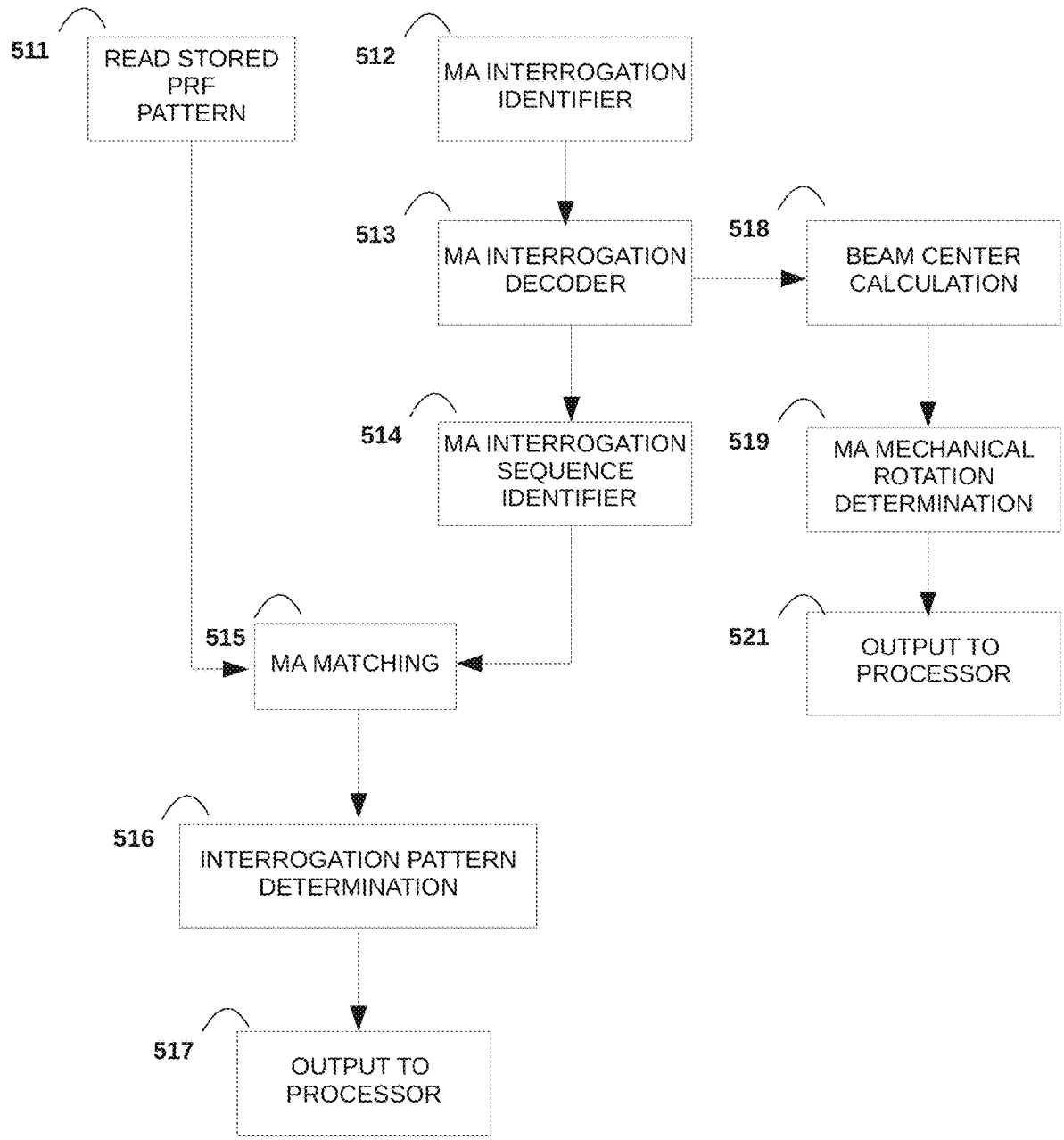
FIG. 5B illustrates a flowchart for obtaining an interrogation pattern.

FIG. 5B details the operation of step 430 for determining the interrogation pattern and mechanical rotation. Step 511 reads the PRF pattern determined and stored from the procedure shown by FIG. 5A. Step 512 identifies the valid P1-P3 or P1-P2-P3 pulse combinations. The confirmation of the pulse is based on the evaluation of its adjacent samples. If a sample passed a threshold set based on the average of the samples close to it, it will be considered to belong to a pulse. Other similar techniques to determine a pulse are well-known in the art, so the detection of a pulse is not limited to the one described above. For a valid interrogation combination, each pulse should have 2 microseconds pulse width. If only P1 and P3 pulses are detected, they should either be 8 microseconds apart for Mode A interrogation or 21 microseconds apart for Mode C interrogation. If P2 pulse is also present, it should be 2 microseconds away from the P1 pulse. Step 513 determines the interrogation mode based on the time interval between P1 and P3 pulses. For interrogation pattern determination, the interrogation mode sequence received from MA is passed to step 514, in which the interrogation repetition pattern is determined. For example, the MA interrogation sequence could be ACACACA if 7 valid interrogation combinations are received. Because the SSR normally does not change the interrogation pattern during operation, the algorithm will identify one Mode A after one Mode C as the repetition pattern of the SSR. Then the step 515 will search through the stored PRF or stagger pattern for a match of the intervals among the received MA interrogations and mark the matched section with the corresponding interrogation mode. After that, step 516 will mark the rest of the interrogations in the stagger pattern with the interrogation sequence identified in 514, so that the interrogation mode of all the interrogations inside the stagger pattern is known. The staggered pattern together with the interrogation pattern are then output to the processor so that the transmit time and mode of any predicted interrogation are determined.

In step 518, the time center of the valid interrogations can be calculated, which represents the time when the center of the MA points to the ownship. With two of this time information, the rotation period can be calculated. Because the SSR rotates at a constant speed, the pointing angle of the SSR MA can be estimated for any given time instance. This information is also passed to processor to estimate the angle β in FIG. 2A or FIG. 2C.

The accuracy of the positioning of the target object 160 is very sensitive to the accuracy of the time measurement because the distance used in the algorithm is calculated by the product of the time and the speed of light.

One embodiment is to increase the accuracy of the time measurement of the leading edge of each pulse. One traditional way of accurate time measurement is to use the GPS time, which generally gives an error of above 50 ns. Even the highly accurate GPS device has an error of about 10 ns, which corresponds to a distance error of 3 m. In some singular cases when the algorithm is very sensitive to the distance measurement, even this 3 m of error can cause a large error in the position calculation. Instead of using GPS, an Analog-to-Digital Converter (ADC) can be used to measure relative time. For example, with a high-speed ADC such as a 1 GS/s ADC, the time accuracy is 1 ns, which is ten times better than a good GPS receiver.

Figure 6A:
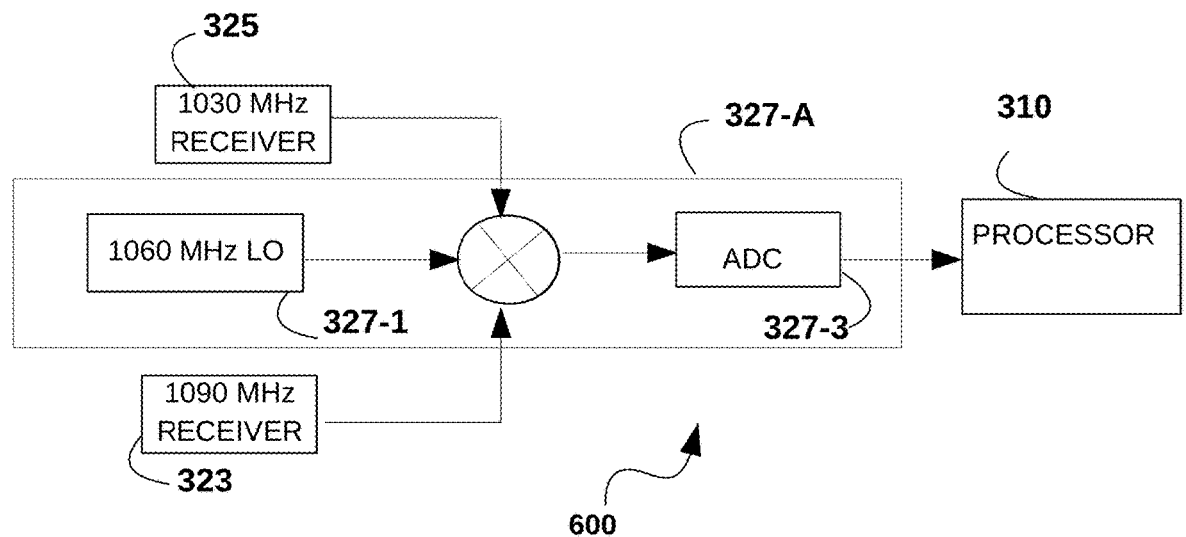
FIGS. 6A and 6B illustrate diagrams for detecting the P2 pulses.
Figure 6B:
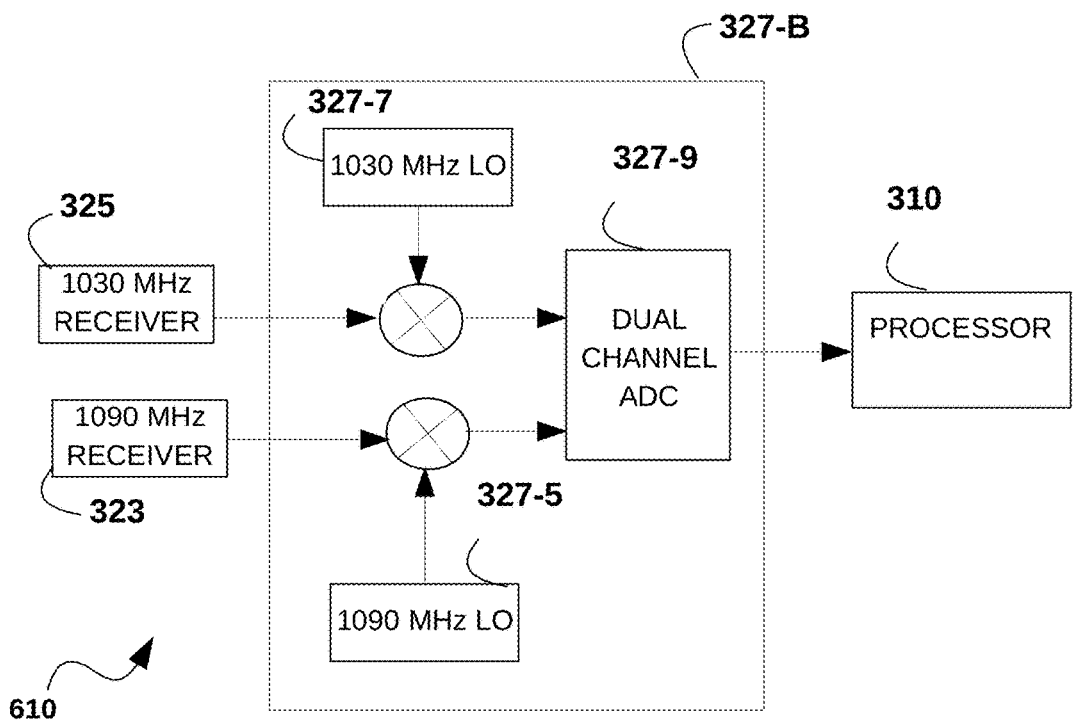

The present invention proposes an improved time measurement strategy that uses a high-speed ADC in the acquisition of the interrogation signals and the reply signals. In one embodiment, the BB/IF processing unit 327 of FIG. 3 includes a high-speed ADC. FIGS. 6A and 6B show different implementations of the BB/IF processing unit 327. In FIG. 6A a single channel high-speed ADC 327-3 is used, while in FIG. 6B a dual channel high-speed ADC 327-3 is used.

As shown in FIG. 6A, the signals from the 1030 MHz receiver 325 and 1090 MHz receiver 323 are mixed in the BB/IF processing unit 327 with a 1060 MHz Local Oscillator 327-1 using a single mixer to generate one channel of intermediate frequency (IF) signal. This signal is then sent to a single channel high-speed ADC 327-3 for A-to-D conversion and the digitized output signal is sent to the processor 310 for further processing as described in FIG. 3.

In FIG. 6B, each of the signals from the 1030 MHz receiver 325 and 1090 MHz receiver 323 is mixed separately in the BB/IF processing unit 327 with a corresponding local oscillator before being fed to a dual channel high-speed ADC 327-9. The signal from the 1030 MHz receiver 325 is mixed with a 1030 MHz Local Oscillator 327-7 in a mixer to generate a first baseband signal. The signal from the 1090 MHz receiver 323 is mixed with a 1090 MHz Local Oscillator 327-5 in a mixer to generate a second baseband signal. The two baseband signals are then sent to a dual channel high-speed ADC 327-9 to generate a digital output signal sent to the processor 310 for further processing as described in FIG. 3. In this embodiment, the two channels in the ADC 327-9 share the same clock keeping the time between the two baseband signals still accurate.

In the embodiments of the present invention, especially when the ownship needs to predict the time instance of a P2 pulse or interrogation when they are not received, depends heavily on the stability of the time of SSR transmission. If the SSR interrogation time changes slowly during time, due to time drift in the electronics of the PSSR, an error will accumulate and propagate so that the predicted/estimated P2 pulse or interrogation time no longer equals the real transmit time of the same P2 pulse/interrogation. In this case, the position calculation of the target object when none of the P1, P2, or P3 pulses is received may be incorrect. Therefore, it is necessary to calibrate the time instance of each of the interrogations in the stagger pattern frequently. The present invention discloses a method for calibrating the time-base using the P2 transmitted from the wide beam antenna of the SSR, which can be done once every several rotations or for every rotation.

The calibration procedure takes several successive P2 pulses or successive interrogations or successive combination of both, to match within the stagger pattern. Once a match is found, the method will compare the predicted time and the real ADC time that those pulses are received, and adjust the predicted time to the real time. The predicted time for other interrogations will also be adjusted by a same amount. To reduce the error of the match and calibration, averaging the real receiving time can be done. Because there are a lot more P2 pulses received in each rotation of the SSR than the P1-P3 pulses, using P2 pulses to calibrate the time drift is more accurate because a statistical process can be done more accurately using more samples, though P1-P3 pulses may be also used if required.

Generally, for faster positioning of the target object 160 after the PSSR 300 is turned on, the first PRF pattern determined according to the method described above will be used for predicting the interrogation transmit time. However, for the time measurement of the P2 pulses, there could be an error compared to the real P2 time. There are two causes for this error. Firstly, the time measurement of the leading edge of the P2 pulse could have several samples deviation. Secondly, the sampling time may not align with the real leading edge of the transmitted P2 pulses.

Therefore, as more P2 pulses are observed, the original PRF pattern calculated is updated statistically. In one embodiment, an exponential filter for better measuring the P2 pulse time is used. As an example, assuming the first time interval in the first determined PRF pattern is $p_1$, the first time interval in the second determined PRF pattern is $p_2, \ldots$, the first time interval in the nth determined PRF pattern is $p_n$, then the first time interval of the updated PRF pattern used in the algorithm can be calculated as average $$p = \frac{p1 + p2 + \ldots + pn}{n}.$$

Alternatively, the first time interval may be determined as a mean value among p1, p2, . . . pn time interval measurements, or as a mean square, or another function of the time interval measurements.

For other time intervals between the adjacent interrogations in the PRF pattern, the same process is performed. This process keeps running at the background as more P2 observed (and hence the same PRF pattern can be determined more times). As the number of observed P2 increases, the filtered PRF pattern will approach the real PRF pattern used by the SSR 110, and hence increase the accuracy of the estimated position of the target object 160. Using P2 for this process can be much easier than only using the MA transmission.

Figure 7:
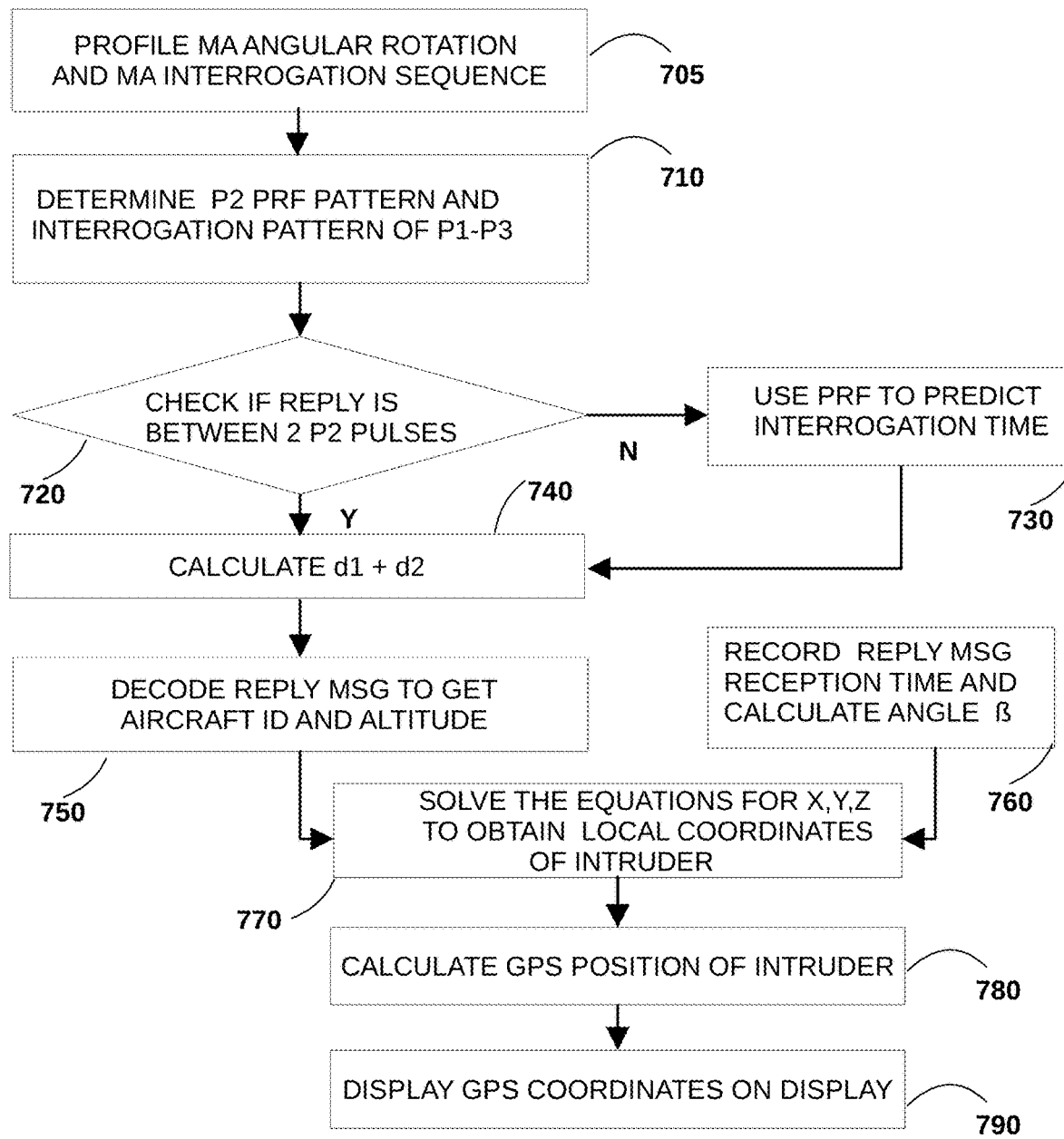
FIG. 7 illustrates an alternative method for determining a position of the target object.

In one exemplary embodiment, a method for finding the position of a target object such as target object 160 is shown in FIG. 7 based on the PRF pattern and the angular rotation profile of the SSR 110 Main Antenna (MA). The steps of the flowchart of FIG. 7 are described below.

Step 705: profile the Main Antenna Angular or mechanical Rotation based on a plurality of detection of SSR Main antenna signals at the ownship 140 by recording the time t1, t2, t3, . . . , every time the ownship 140 is in the MA beam (ownship 140 receives valid interrogation). t2–t1 is the time that MA of SSR 110 rotates 360 degrees with a constant speed. Knowing t1 and angular rotation speed va=360/(t2–t1) degrees/sec, the pointing direction of MA can be calculated at any given time t. Additionally, the angular position may be also calibrated every time the MA illuminates the ownship 110 to prevent rotation drift error. This step also decodes the mode of the successive interrogation messages and determines the interrogation pattern sequence using the P1-P3 pulses or valid interrogation receive in MA.

Step 710: Use signal from wide-beam antenna to determine the PRF pattern of P2. The algorithm for determining the PRF pattern is executed by the processor 310 as stated earlier. After the staggered pattern is determined, the interrogation pattern for all the interrogations in the stagger pattern can be determined using the procedure in FIG. 5B.

Step 720: When a reply message from the target object 160 is received, we first check if it is within between two P2 pulses. Alternatively the check can be performed based on P1-P3 combination or P1-P2-P3 combination from the MA of the SSR 110. If "yes", calculate d1+d2 (as shown in FIG. 2) in step 740. If "no", use the PRF and interrogation pattern to predict interrogation time in Step 730. If the prediction is correct, the reply message will be in between two estimated interrogation times. Then d1+d2 can still be calculated.

Step 750: Decode the reply message to get the aircraft ID and altitude.

Step 760: At the same time, record the receiving time of the reply message. Because the angular rotation of the MA is profiled, the angle β at which the target object is in the main lobe of MA (main antenna) beam is calculated.

Step 770: Solve the spheroidal equations to obtain the x,y,z coordinates of the target object in local coordinates system.

Step 780: Calculate the GPS position of the target object using local x, y and z coordinates.

Step 790: Input the GPS information into the display of the tracking system 360 and provide alarm to the ownship 140 when needed.

When P2 cannot be received, for example, the ownship 140 is too far from the SSR 110 so that only the main lobe interrogation signal can be received, it is still possible to only use the main lobe interrogation signal to determine the staggered pattern. However, this could take longer time because only part of (normally 5 to 10 interrogations depending on the signal strength) the staggered pattern can be received for each rotation of the SSR MA.

Figure 8:
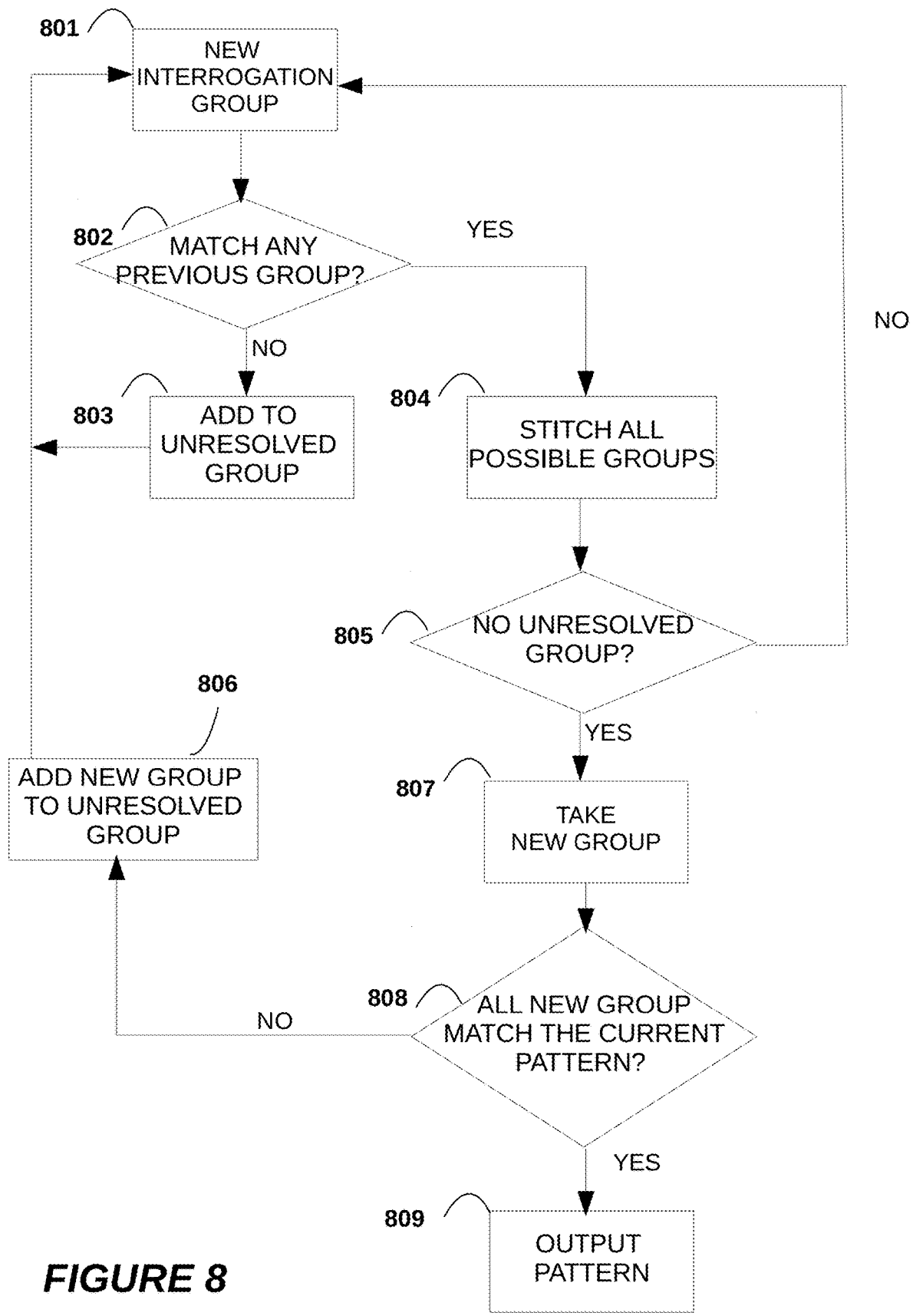
FIG. 8 illustrates a flowchart for determining the PRF pattern using main antenna signals.

FIG. 8 shows a procedure for determining the staggered pattern using only the SSR MA signal. All the received successive MA pulses are treated and stored as a group as shown in block 801. For any new group, the algorithm first checks if any part of the new group, which should be at least 2 successive intervals, matches any part of the previous group (step 802). If there is no match, the algorithm will add the new group to the unresolved groups in step 803 and wait until new group is received. If there is a match, the algorithm will first stitch the new group with the matched group and then go through all the unresolved groups to see if there is any new match in 804 because the new group could bridge two existing unresolved groups. If there are still unresolved groups, all the stitched group will be stored as a longer new unresolved group, and the algorithm goes back to 801 to read new group. This process continues until all the unresolved groups are stitched together, which forms a temporary staggered pattern, and the algorithm goes to step 807. This step reads a new group and tries to match it in the temporary staggered pattern. In step 808, there is a timer that controls how many new matches are considered to be enough. For example, if the algorithm takes time T to form the current temporary staggered pattern, then it could be another nT (n can be 1, 2, 3, . . . ) time in step 808 to be considered. If all the new groups received in this nT interval match the temporary pattern, the algorithm will propose the temporary pattern to be a final staggered pattern (step 809). Once the ownship 140 can receive the wide-beam SLS signal, the algorithm will automatically verify the staggered pattern determined using the P2 pulses train to see if both staggered patterns match.

In another aspect of the invention, when the target object does not have a transponder, the principle of the embodiments of the present invention can still be used to determine a position of the target object 160. In this case, the ownship 140 will listen to the reflection of the interrogation signal from the target object 160. Because when the target object 160 is in the beam of the SSR 110, the energy of the interrogation signal will be reflected from the target object 160 and received by the ownship 140. This receive time gives the same information as the receive time of the reply message, which can be used to calculate $d_1+d_2$ in FIG. 2A together with the staggered and interrogation pattern. The information that is still missing is the altitude of the target object, without which only a 2D positioning is possible. The lack of the altitude information can be compensated by using a phased array receiver so that the angle of arrival (AOA) of the reflection is determined. With the AOA information, the 3D position of the target object can be now determined. The accuracy of the position depends on the accuracy of the AOA measurement, which means a larger array will give better position accuracy.

In another aspect of the invention, a coherent or non-coherent processing can be performed when multiple reflected interrogation signals are received. At any given time period, because of the mechanical rotation of the SSR antenna, the staggered pattern and the interrogation mode pattern are known, the time intervals between all the transmitted interrogations in this time period can be estimated. Therefore, expected time intervals between the reflections of these interrogations are also known. Hence a coherent processing can be done by adding samples separated with these time intervals to improve the signal to noise ratio (SNR). For example, if the expected interrogation time intervals are $t_1, t_2, t_3, \ldots$, then the samples that are $t_1, t_2, t_3, \ldots$ from a start point of the received signal will be added together to compete with noise. This start point of the coherent process can be sliding within a reasonable window inside which the first reflected interrogation can arrive. By doing this, the reflected interrogations that are submerged within the noise floor can be enhanced and detected, and so will be the target object.

In a further embodiment, past measurements may be used to make the position of the target object 160 more precise, for example the target object 160 is interrogated every n seconds if SSR 110 rotates at delta rpm, where both the target object 160 and the ownship 140 (observer) are moving.

The teachings of the present disclosure can be applied in various scenarios including 1) whether or not the target object 160, the ownship 140 and the SSR 110 are coplanar; 2) whether or not the target object 160, the ownship 140 and the SSR 110 are co-linear, but not co-altitude; 3) whether or not the target object 160, the ownship 140 and the SSR 110 are co-linear and co-altitude (singularity scenario).

The present PSSR system for target object detection can be used as part of an advisory system to support a decision making during potential collision of a UAV or a manned aircraft.

The present invention can as well be used to predict the target object future trajectory for a certain time look-ahead, and graphical display of current and predicted trajectory in 4D on the display of the ownship 140 and/or a Ground Control Station (GCS) computer. It may further comprise a decision support engine in the situation of high probability of potential collision and use the tracking system 360 for graphical and audio warnings to the pilot. The target object 160 trajectory prediction may be made with a certain time lookahead, where the lookahead time depends on the estimated heading and speed of the target object 160 while approaching the ownship 140. The decision support engine during collision avoidance may use online discrete-event supervisory control based on a predicted TTC (time-to-collision) and a predicted trajectory of the target object 160 for the cases of full detectability and detection singularity that occurs when the ownship 140, and the SSR 110 are co-linear.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect. For example, the principles of the invention can be applied to other contexts such as marine or nautical and terrestrial context.

The processes described above, as applied to a social graph of a vast population, are computationally intensive requiring the use of multiple hardware processors. A variety of processors, such as microprocessors, digital signal processors, and gate arrays, may be employed. Generally, processor-readable media are needed and may include floppy disks, hard disks, optical disks, Flash ROMS, non-volatile ROM, and RAM.

It should be noted that methods and systems of the embodiments of the invention and data sets described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media.

Methods and systems of the present invention have tangible and practical advantages, providing more expedient and more reliable processing of vast amounts of data.

Thus, an improved method and system for passive secondary surveillance radar tracking have been provided.

The invention claimed is:

1. A method for determining a pulse repetition frequency (PRF) pattern for staggered interrogation pulses (P1, P2, P3) of a Secondary Surveillance Radar (SSR), the SSR comprising a main antenna and a wide-beam antenna whose beam-width is wider than a beam-width of the main antenna, pulses P1 and P3 being generated by the main antenna, and pulses P2 being generated by the wide-beam antenna, each of the P2 and P3 pulses being synchronized with a respective P1 pulse with respective first and second predefined time delays, the method comprising:
at a Passive Secondary Surveillance Radar (PSSR) spaced apart from the SSR:
(i) during a time window when the PSSR is within the beam-width of the wide-beam antenna, and thereby P2 pulses become detectable at the PSSR, detecting successive P2 pulses;
(ii) forming a time-ordered sequence of P2 pulse intervals derived from the P2 pulses detected in the step (i);
(iii) determining a pulse repetition pattern of P2 pulses using the time-ordered sequence of P2 pulse intervals, comprising:
(iii-1) provided at least one P2 pulse interval for a next detected P2 pulse is already present in the time-ordered sequence determined in the step (iii), and the time-ordered sequence of P2 pulse intervals starts repeating, determining the pulse repetition pattern of P2 pulses using the time-ordered sequence;
(iii-2) otherwise, repeating the steps (i) to (iii-1); and
(iv) when the PSSR is within the beam-width of the main antenna, detecting P1 and P3 pulses, and determining a value of the second predefined time delay between P3 and P1 pulses, thereby determining an interrogation mode of the SSR;
(v) obtaining a value of the first predefined time delay, and deriving the PRF pattern for the staggered interrogation pulses (P1, P2, P3) of the SSR based on the pulse repetition pattern of P2 pulses determined in the step (iii), and corresponding values of the first and second predefined time delays.

2. The method of claim 1, further comprising predicting a transmit time for a P3 pulse based on said PRF pattern provided the PSSR is outside the beam-width of the wide-beam antenna, thereby determining the transmit time for the P3 pulse when P2 pulses from the wide-beam antenna are not detectable.

3. The method of claim 2, further comprising determining a position of a target object using the transmit time of the P3 pulse and a reply message from said target object received at said PSSR, wherein said reply message is in response to an interrogation from the SSR.

4. The method of claim 3, wherein determining the position comprises determining a position of an aerial, nautical or ground object.

5. The method of claim 1, wherein the step (i) comprises detecting a first and second successive P2 pulses, each having a respective pulse detection time, and the step (ii) comprises determining a first pulse interval between the first and second successive P2 pulses, and storing the first pulse interval as the time-ordered sequence of P2 pulses.

6. The method of claim 5, wherein the step (iii-1) further comprises:
(iii-1) determining a new pulse interval between a new P2 pulse and a last received P2 pulse; and
(iii-1b) provided said new pulse interval does not match the first pulse interval, adding said new pulse interval to the time-ordered sequence of P2 pulse intervals, and repeating the steps (iii-1a) to (iii-1b).

7. The method of claim 6, wherein the step (iii-1) further comprises:
provided said new pulse interval matches the first pulse interval, and the time-ordered sequence repeats upon detecting further P2 pulses, determining the pulse repetition pattern of P2 pulses based on the repeating time-ordered sequence.

8. The method of claim 1, wherein the step (iii) further comprises applying statistical processing or averaging for updating said PRF pattern.

9. The method of claim 1, wherein the PSSR is one of the following:
a stationary PSSR;
a mobile PSSR.

10. The method of claim 1 further comprising determining an interrogation mode of the PRF pattern, comprising:
(i) determining an interrogation mode sequence of said main antenna using P1 and P3 pulse combinations; and
(ii) matching said interrogation mode sequence in the PRF pattern.

11. The method of claim 1 further comprising performing a calibration operation to compensate for a time drift caused by electronics in said PSSR, thereby improving accuracy of determining the PRF pattern.

12. The method of claim 1, further comprising processing multiple reflected interrogation signals for improving signal-to-noise ratio.

13. The method of claim 1, wherein the first predefined time delay is 2 µs, and the second predefined time delay is one of the 8 µs and 21 µs.

14. The method of claim 1, further comprising determining a position of a transponder-equipped target object, when a communication between the SSR and the PSSR is blocked, resulting in the PSSR being capable of receiving a reply from the transponder-equipped target object in response to an interrogation signal from the SSR, while not being capable of receiving the interrogation signal from the SSR, the method comprising:
storing the PRF in a memory;
at the PSSR:
detecting a receipt time of the reply from the transponder-equipped target object;
back calculating a transmit time of the interrogation signal using the receipt time and the stored PRF; and
determining the position of the transponder-equipped target object comprising using the receipt time of the reply and the back calculated transmit time of the interrogation signal, thereby determining the position of the transponder-equipped target object when the communication between the SSR and the PSSR is blocked.

15. The method of claim 14, further comprising transmitting the interrogation signal at 1030 MHz, and the reply at 1090 MHz.

16. A Passive Secondary Surveillance Radar (PSSR) for determining a pulse repetition frequency (PRF) pattern for staggered interrogation pulses (P1, P2, P3) of a Secondary Surveillance Radar (SSR), the SSR comprising a main antenna and a wide-beam antenna whose beam-width is wider than a beam-width of the main antenna, pulses P1 and P3 are generated by the main antenna, and pulses P2 are generated by the wide-beam antenna, each of the P2 and P3 pulses being synchronized with a respective P1 pulse with respective first and second predefined time delays, the PSSR comprising:

a memory coupled to a processor and having computer executable instructions stored thereon, causing the processor to:
    detect successive P2 pulses when the PSSR is within the beam-width of the wide-beam antenna;
form a time-ordered sequence of the detected P2 pulse intervals;
(iii) determine a pulse repetition pattern of P2 pulses using the time-ordered sequence of P2 pulse intervals, comprising:
    (iii-1) provided at least one P2 pulse interval for a next detected P2 pulse is already present in the time-ordered sequence, and the time-ordered sequence of P2 pulse intervals starts repeating, determining the pulse repetition pattern of P2 pulses using the time-ordered sequence;
    (iii-2) otherwise, repeating (i) to (iii-1);
(iv) when the PSSR is within the beam-width of the main antenna, detect P1 and P3 pulses, and determine a value of the second predefined time delay between P3 and P1 pulses, thereby determining an interrogation mode of the SSR;
(v) obtain a value of the first predefined time delay, and derive the PRF pattern for the staggered interrogation pulses (P1, P2, P3) of the SSR based on the pulse repetition pattern of P2 pulses, and values of the first and second predefined time delays.

17. The PSSR of claim 16, wherein the computer executable instructions further cause the processor to determine an interrogation pattern of said PRF pattern based on P1 and P3 pulse combinations.

18. The PSSR of claim 16, wherein the computer executable instructions further cause the processor to predict a transmit time for P3 pulse based on said PRF pattern provided the PSSR is outside the beam-width of the wide-beam antenna.

19. The PSSR of claim 16, wherein the computer executable instructions further cause the processor to determine a position of a target object using a transmit time of an interrogation.

20. The PSSR of claim 16, wherein the target object is one of an aerial, nautical or ground object.

21. A method for determining a position of a target object, comprising:
at a Passive Secondary Surveillance Radar (PSSR) spaced apart from a Secondary Surveillance Radar (SSR):
(a) determining a pulse repetition frequency (PRF) pattern for staggered interrogation pulses (P1, P2, P3) of the SSR, the SSR comprising a main antenna and a wide-beam antenna whose beam-width is wider than a beam-width of the main antenna, pulses P1 and P3 being generated by the main antenna, and pulses P2 being generated by the wide-beam antenna, each of the P2 and P3 pulses being synchronized with a respective P1 pulse with respective first and second predefined time delays, comprising:
    (i) during a time interval when the PSSR is within the beam-width of the wide-beam antenna, and thereby P2 pulses are detectable, detecting successive P2 pulses;
    (ii) forming a time-ordered sequence of P2 pulse intervals derived from the P2 pulses detected in the step (i);
    (iii) determining a pulse repetition pattern of P2 pulses using the time-ordered sequence of P2 pulse intervals, comprising:
    (iii-1) provided at least one P2 pulse interval for a next detected P2 pulse is already present in the time-ordered sequence determined in the step (iii), and the time-ordered sequence of P2 pulse intervals starts repeating, determining the pulse repetition pattern of P2 pulses using the time-ordered sequence;
    (iii-2) otherwise, repeating the steps (i) to (iii-1);
    (iv) when the PSSR is within the beam-width of the main antenna, detecting P1 and P3 pulses, and determining a value of the second predefined time delay between P3 and P1 pulses, thereby determining an interrogation mode of the SSR; and
    (v) obtaining a value of the first predefined time delay, and deriving the PRF pattern for the staggered interrogation pulses (P1, P2, P3) of the SSR, comprising using the pulse repetition pattern of P2 pulses determined in the step (iii), and values of the first and second predefined time delays;
(b) receiving a reply from the target object in response to an interrogation signal comprising a P3 pulse sent by the SSR to said target object;
(c) estimating a transmit time of said P3 pulse of the interrogation signal based on a reception time of said reply, and the PRF pattern; and
(d) determining the position of the target object using an altitude information h of the target object contained in said reply, a location of the SSR, said estimated transmit time of said P3 pulse of the interrogation signal, and said reception time of said reply.

22. The method of claim 21 further comprising determining an interrogation pattern of said PRF pattern based on P1 and P3 pulse combinations.

23. The method of claim 21, wherein the step (a) of determining the PRF pattern of the SSR is performed prior to interrogating the target object.

24. A Passive Secondary Surveillance Radar (PSSR) system for determining a position of a target object, comprising:
(a) a first receiver for receiving a reply from the target object wherein said reply is responsive to an interrogation signal comprising a P1 and a P3 pulse sent by a main antenna of a Secondary Surveillance Radar (SSR) to said target object;
(b) a second receiver for receiving a plurality of P2 pulses from the SSR, said P2 pulses being transmitted in a staggered pattern by a wide-beam antenna of the SSR having a beam-width wider than a beam-width of the main antenna; and
a memory coupled to a processor and having computer executable instructions stored thereon, causing the processor to:
(c) determine a pulse repetition frequency (PRF) pattern for staggered interrogation pulses (P1, P2, P3) of the SSR, comprising:
    (i) detecting successive P2 pulses when the PSSR is within the beam-width of the wide-beam antenna;
    (ii) forming a time-ordered sequence of the detected P2 pulse intervals;
    (iii) determining a pulse repetition pattern of P2 pulses using the time-ordered sequence of P2 pulse intervals, comprising:
    (iii-1) provided at least one P2 pulse interval for a next detected P2 pulse is already present in the time-ordered sequence, and the time-ordered sequence of P2 pulse intervals starts repeating, determining the pulse repetition pattern of P2 pulses using the time-ordered sequence;

(iii-2) otherwise, repeating (i) to (iii-1);

(iv) when the PSSR is within the beam-width of the main antenna, detecting P1 and P3 pulses, and determining a value of the second predefined time delay between P3 and P1 pulses, thereby determining an interrogation mode of the SSR; and (v) obtaining a value of the first predefined time delay, and deriving the PRF pattern for the staggered interrogation pulses (P1, P2, P3) of the SSR, based on the pulse repetition pattern of P2 pulses, and values of the first and second predefined time delays;

(d) estimate a transmit time of said interrogation signal based on a reception time of said reply, and the PRF pattern; and (e) determine the position of the target object based on an altitude information of the target object present on said reply, a location of the SSR, said transmit time of said interrogation signal, and said reception time of said reply.

25. The PSSR system of claim 24 further comprising:
a mixer and a local oscillator for translating the reply into an intermediate frequency band reply signal and for translating the P2 pulses into an intermediate frequency band P2 pulses; and
a single channel high-speed Analog-to-Digital Converter (ADC) for digitizing said intermediate frequency band reply signal and said intermediate frequency band P2 pulses and transmitting the digitized intermediate frequency band reply signal and the digitized intermediate frequency band P2 pulses to said processor.

26. The PSSR system of claim 24 further comprising:
a first mixer and a first local oscillator for translating the reply into a base band reply signal;
a second mixer and a second local oscillator for translating the P2 pulses into a base band P2 pulses; and
a dual channel high-speed Analog-to-Digital Converter (ADC) for sampling said base band reply signal and said base band P2 pulses, and transmitting sampled base band reply signal and sampled base band P2 pulses to said processor.

27. The PSSR system of claim 24 wherein the location of the PSSR is determined using a global positioning (GPS) receiver and wherein the location of the SSR is a fixed location known to the PSSR system.

28. The PSSR system of claim 24, wherein the computer readable instructions causing the processor to determine the PRF pattern of the SSR are configured to be executed prior to interrogating the target object.

* * * * *